(12) United States Patent
Zhai et al.

(10) Patent No.: US 12,493,367 B1
(45) Date of Patent: Dec. 9, 2025

(54) SMART WEARABLE DEVICE

(71) Applicant: GYGES LABS PTE. LTD., Kaki Bukit (SG)

(72) Inventors: Yingnan Zhai, Shenzhen (CN); Zheng Lyu, Shenzhen (CN); Can Ye, Shenzhen (CN); Yanzhi Chen, Shenzhen (CN); Junzhu Tang, Shenzhen (CN); Zhenzhan Zhu, Shenzhen (CN); Shuping Jiang, Shenzhen (CN)

(73) Assignee: GYGES LABS PTE. LTD., Kaki Bukit (SG)

( * ) Notice: Subject to any disclaimer, the term of this patent is extended or adjusted under 35 U.S.C. 154(b) by 0 days.

(21) Appl. No.: 18/807,695

(22) Filed: Aug. 16, 2024

(51) Int. Cl.
*G06F 3/0362* (2013.01)
*G06F 3/01* (2006.01)
*G06F 3/038* (2013.01)
*H05K 5/00* (2006.01)

(52) U.S. Cl.
CPC ............ *G06F 3/0362* (2013.01); *G06F 3/011* (2013.01); *G06F 3/0383* (2013.01); *H05K 5/0047* (2013.01); *H05K 5/0086* (2013.01)

(58) Field of Classification Search
CPC combination set(s) only.
See application file for complete search history.

(56) References Cited

U.S. PATENT DOCUMENTS

| | | | | |
|---|---|---|---|---|
| 2011/0007035 A1* | 1/2011 | Shai | ................ | G06F 3/0304 345/179 |
| 2016/0378235 A1* | 12/2016 | Dow | ................. | G06F 3/0227 345/174 |
| 2017/0016748 A1* | 1/2017 | Song | .................. | G06F 1/163 |
| 2021/0096657 A1* | 4/2021 | D'Amone | ........... | G06F 3/014 |

FOREIGN PATENT DOCUMENTS

| | | |
|---|---|---|
| CN | 205912322 U | 1/2017 |
| CN | 106775114 A | 5/2017 |
| CN | 106102347 B | 12/2018 |
| CN | 211268917 U | 8/2020 |
| CN | 107229341 B | 12/2020 |
| CN | 117158700 A | 12/2023 |
| CN | 117882927 A | 4/2024 |

\* cited by examiner

*Primary Examiner* — William Boddie
*Assistant Examiner* — Alecia D English

(57) ABSTRACT

A smart wearable device includes a first housing, a second housing, an electrical trace assembly arranged between the first housing and the second housing, and a circuit board assembly arranged between the first housing and the second housing. The second housing is sleeved on an outer side of the first housing. The second housing and the first housing are configured to be movable relative to each other and drive the electrical track assembly and the circuit board assembly to cooperate with each other and trigger an electrical signal. The smart wearable device is easy to operate and has high interaction efficiency.

20 Claims, 14 Drawing Sheets

US 12,493,367 B1

SMART WEARABLE DEVICE

TECHNICAL FIELD

The present disclosure relates to the technical field of smart devices, and in particular to a smart wearable device.

BACKGROUND

A smart wearable device may realize the following functions, such as health monitoring, motion tracking, information reminding, voice assistant, navigation, playback control, etc. With the development of augmented reality (AR), virtual reality (VR), mix reality (MR), and other technologies, a wearable device such as a head-mounted device may bring users a deeper digital experience. In the related art, the smart wearable device, such as a smart ring, is inconvenient to operate and has low interaction efficiency.

SUMMARY OF THE DISCLOSURE

According to a first aspect, some embodiments of the present disclosure provide a smart wearable device. The smart wearable device includes a first housing, a second housing, an electrical track assembly, and a circuit board assembly. The second housing is sleeved on an outer side of the first housing. The second housing and the first housing are configured to be movable relative to each other and drive the electrical track assembly and the circuit board assembly to cooperate with each other and trigger an electrical signal.

According to a second aspect, some embodiments of the present disclosure provide a smart wearable device. The smart wearable device includes a first housing; a second housing, sleeved on an outer side of the first housing; an electrical track assembly, arranged between the first housing and the second housing; and a circuit board assembly, arranged between the first housing and the second housing; wherein the electrical track assembly is arranged on the outer side of the first housing, and the circuit board assembly is arranged on an inner side of the second housing, the second housing and the first housing are configured to be movable relative to each other, and the electrical track assembly and the circuit board assembly are driven to cooperate with each other and trigger an electrical signal.

According to a third aspect, some embodiments of the present disclosure provide a smart wearable device. The smart wearable device includes a first housing; a second housing, sleeved on an outer side of the first housing; an electrical track assembly, arranged between the first housing and the second housing; and a circuit board assembly, arranged between the first housing and the second housing; wherein the electrical track assembly comprises a first track segment arranged on the outer side of the first housing, and a conductive printing layer is arranged on a surface of the circuit board assembly close to the electrical track assembly; and the second housing is rotatable relative to the first housing, and the electrical track assembly is driven to be in contact with and electrically connected to the circuit board assembly, to trigger an electrical signal.

BRIEF DESCRIPTION OF THE DRAWINGS

In order to more clearly illustrate the technical solutions in the embodiments of the present disclosure, a brief description of the accompanying drawings to be used in the description of the embodiments will be given below. It will be obvious that the accompanying drawings in the following description are only some embodiments of the present disclosure, and that other accompanying drawings may be obtained on the basis of these drawings without any creative effort for those skilled in the art.

Figure 1:
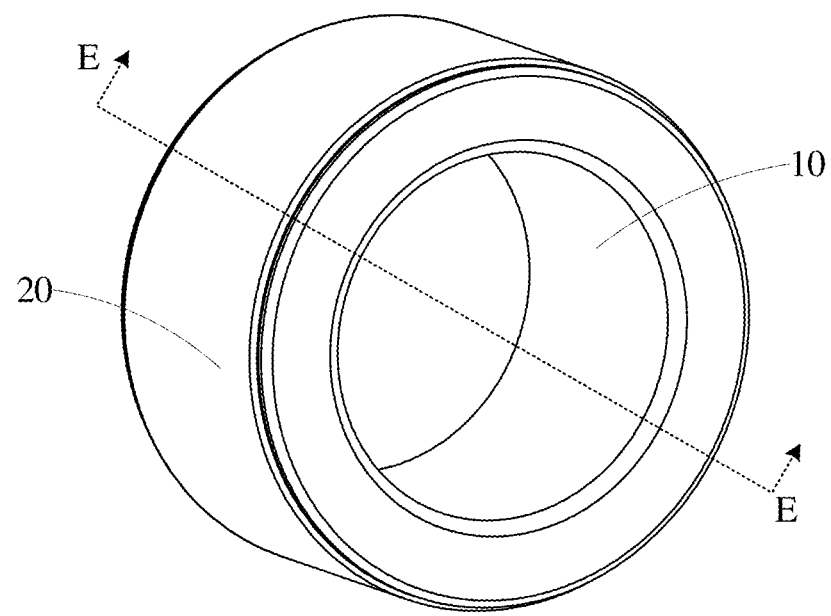
FIG. 1 is an overall structural schematic view of a smart wearable device according to some embodiments of the present disclosure.

Reference numerals in drawings: 100, smart wearable device; 210, processor; 220, memory; 230, peripheral device interface; 240, radio frequency circuit; 250, display screen; 260, audio circuit; 270, power source interface; 300, terminal device; 310, controller; D1, first position; D2, second position; Wz, peripheral width; 10, first housing; 12, first annular flange; 20, second housing; 21, touch electrode; 22, second annular flange; 25, ball; 251, first clamping portion; 252, second clamping portion; 30, circuit board assembly; 31, third housing; 311, third annular flange; 312, first notch;

32, circuit board; 321, main body segment; 3211, first surface; 3212, second surface; 322, bending segment; 3221, first bending segment; 3222, second bending segment; 3223, third surface; 3224, fourth surface; 33, conductive printing layer; 336, first barrier area; 331, first electrical area; 3311, first strip-shaped portion; 3312, first protruding portion; 332, second electrical area; 3321, second strip-shaped portion; 3322, second protruding portion; 333, third electrical area; 334, fourth electrical area; 335, second barrier area; 330, third barrier area; 3301, first sub barrier area; W1, first width; 3302, second sub barrier area; W2, second width; 34, electrical assembly; 341, first electrical component; 342, second electrical component; 40, electrical track assembly; 41, trackpad; 411, first track segment; 4111, first end; 4112, second end; 4113, first protrusion; 4114, first recess; 412, second track segment; 4121, first fixing segment; 4122, first elastic piece; 4123, second protrusion; 4124, second recess; 413, third track segment; 4131, second fixing segment; 4132, second elastic piece; 4133, third protrusion; 4134, third recess; 42, bracket; 421, opening; 43, elastic member; 44, first gap; 441, first sub-gap; 442, second sub-gap; 45, second gap; 46, third gap; 47, fourth gap; 50, battery; 501, second notch; 60, annular cover plate; 70, rotating housing; 80, annular accommodating cavity; 81, fifth gap.

DETAILED DESCRIPTION

Technical solutions in the embodiments of the present disclosure will be described clearly and completely in the following by referring to the accompanying drawings in the embodiments of the present disclosure. Apparently, the described embodiments show only a part of, but not all of, the embodiments of the present disclosure. All other embodiments, which are obtained by any ordinary skilled person in the art based on the embodiments in some embodiments of the present disclosure without making creative work, shall fall within the scope of the present disclosure.

Terms "first", "second", "third", etc., in some embodiments of the present disclosure are used for descriptive purposes only and shall not be interpreted as indicating or implying relative importance or implicitly specifying the number of technical features indicated. Therefore, a feature defined by "first", "second", "third", etc., may include at least one such feature either explicitly or implicitly. In the description of the present disclosure, "plurality" means at least two, such as two, three, and so on, unless otherwise expressly and specifically limited. All directional indications (such as up, down, left, right, front, rear, . . . ) in the embodiments of the present disclosure are used only to explain relative positional relationships and relative movements between components disposed in a particular attitude (the attitude as shown in the accompanying drawings). If the particular attitude changes, the directional indication changes accordingly. In some embodiments, terms "include", "have", and any variations thereof, are intended to cover non-exclusive inclusion. For example, a process, a method, a system, a product or an apparatus including a series of operations or units is not limited to the listed operations or units, but optionally further includes operations or units that are not listed, or optionally includes other operations or units that are inherently included in the process, the method, the product or the apparatus "Embodiment" herein implies that particular features, structures, or characteristics described in an embodiment may be included in at least one embodiment of the present disclosure. Presence of the term at various sections in the specification does not necessarily refer to one same embodiment, nor a separate or alternative embodiment that is mutually exclusive of other embodiments. It is understood by any ordinary skilled person in the art, both explicitly and implicitly, that the embodiments described herein may be combined with other embodiments.

A smart wearable device may realize the following functions, such as health monitoring, motion tracking, information reminding, voice assistant, navigation, playback control, etc. With the development of augmented reality (AR), virtual reality (VR), mix reality (MR), and other technologies, a wearable device such as a head-mounted device may bring users a deeper digital experience. An interaction manner of the smart wearable device may be as follow. A physical control key may be arranged on a housing of the head-mounted device, or a capacitive sensor may be arranged on the housing, so as to achieve interaction with the head-mounted device. Another interactive manner of the smart wearable device may further include a manner of using a camera to collect a hand posture of a user, such as finger pinching, palm sliding, and other information to achieve interaction. There are other interaction manners for external wearable devices, such as a smart ring, a bracelet, etc., to be combined with each other. However, the device is generally arranged with a component such as an inertia sensor, a capacitance sensor, etc. The device further establishes a communication connection with an apparatus needing to interact with through touch to achieve interaction. In addition, the interaction manner of the sensor is prone to false touch or false monitoring. Therefore, it is an urgent problem to provide a wearable device which has a novel structure, convenient operation, and high interaction efficiency.

In order to solve the above problem, a smart wearable device is provided by some embodiments of the present disclosure, which has a novel structure.

Figure 2:
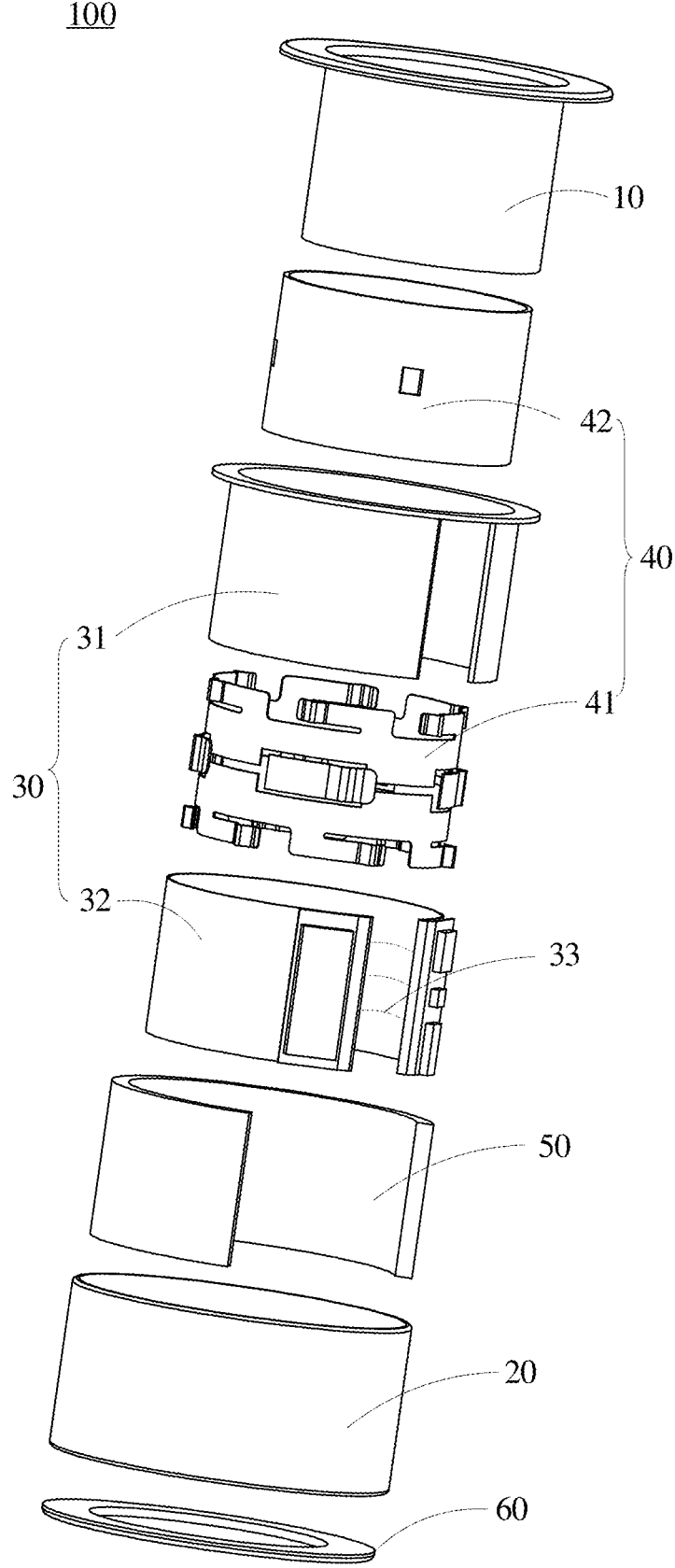
FIG. 2 is an exploded schematic view of the smart wearable device according to some embodiments of the present disclosure.
Figure 3:
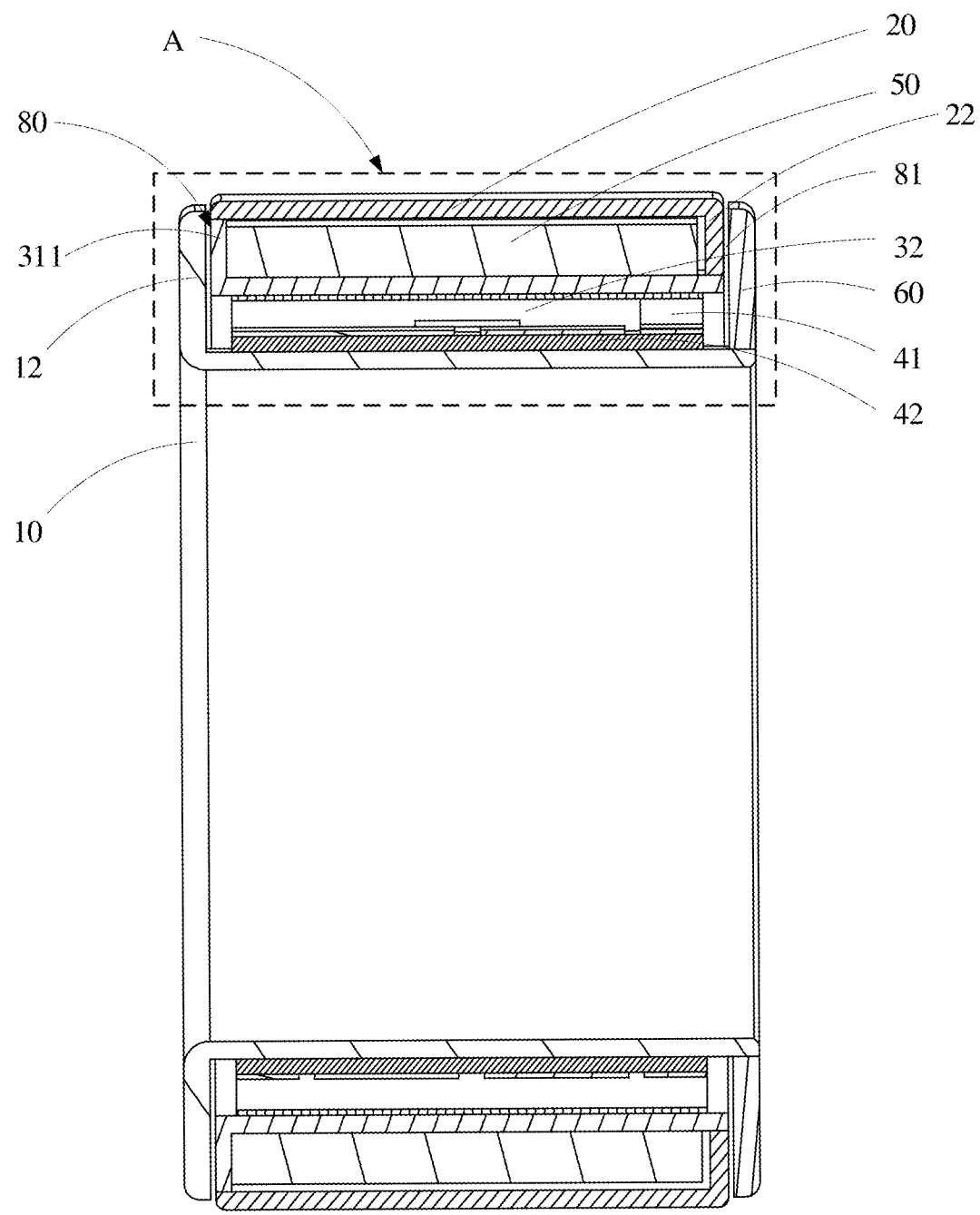
FIG. 3 is a cross-sectional structural schematic view of the smart wearable device in FIG. 1 along an E-E direction.
Figure 18:
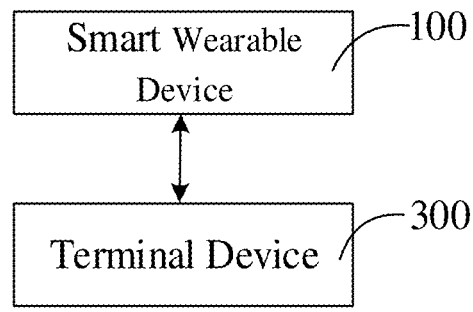
FIG. 18 is a structural schematic view of the smart wearable device connected to a terminal device according to some embodiments of the present disclosure.

As shown in FIGS. 1-3 and FIG. 18, FIG. 1 is an overall structural schematic view of a smart wearable device according to some embodiments of the present disclosure, FIG. 2 is an exploded schematic view of the smart wearable device according to some embodiments of the present disclosure, FIG. 3 is a cross-sectional structural schematic view of the smart wearable device in FIG. 1 along an E-E direction, and FIG. 18 is a structural schematic view of the smart wearable device connected to a terminal device according to some embodiments of the present disclosure.

A smart wearable device 100 provided by some embodiments of the present disclosure may be communicatively connected to an external terminal device 300, such as a smartphone, a computer, a tablet, an augmented reality (AR) head-mounted device, a virtual reality (VR) head-mounted device, a mix reality (MR) head-mounted device, a near eye display, a smart glasses and other head-mounted devices. The smart wearable device 100 is capable of interacting with the terminal device 300 for a use interaction or a function interaction of graphical user interface (GUI), such as sliding browsing, page turning, confirmation, deletion, and other function interaction of GUI.

The smart wearable device 100 provided in some embodiments of the present disclosure may include a first housing 10, a second housing 20, an electrical track/trace assembly 40, and a circuit board assembly 30. The second housing 20 is sleeved on an outer side of the first housing 10. The electrical track assembly 40 is arranged between the first housing 10 and the second housing 20. The circuit board assembly 30 is arranged between the first housing 10 and the second housing 20. The second housing 20 and the first housing 10 are configured to be movable relative to each other, and the electrical track assembly 40 and the circuit board assembly 30 are driven to cooperate with each other and trigger an electrical signal.

In some embodiments, the second housing 20 is sleeved on a periphery of the first housing 10, such that an annular accommodating cavity 80 is defined between the first ring and the second housing 20. Each of the electrical track assembly 40 and the circuit board assembly 30 is arranged between the first housing 10 and the second housing 20. In some embodiments, the first housing 10 and the second housing 20 are annular, and the first housing 10 is coaxial with the second housing 20. In addition, each of the first housing 10 and the second housing 20 may be made of an insulating material, so as to reduce an occurrence of short circuit between the first housing 10 and/or the second housing 20 and other components, such as the electrical track assembly 40, the circuit board assembly 30, etc.

In an embodiment, the electrical track assembly 40 is arranged on the outer side of the first housing 10, and thus the electrical track assembly 40 may be driven to rotate by the first housing 10. The circuit board assembly 30 is arranged on an inner side of the second housing 20, and thus the electric circuit board assembly 30 may be driven to rotate by the second housing 20. At the same time, the circuit board assembly 30 is arranged on an outer side of the electrical track assembly 40, such that a circuit board 32 may be designed with the relatively large length based on the needs. At the same time, it may be possible to facilitate the processing of the circuit board assembly 30 and an overall installation of the smart wearable device 100.

The electric track assembly 40 is close to the circuit board assembly 30. A conductive printing layer 33 is arranged on a surface of the circuit board assembly 30 close to the electrical track assembly 40. The second housing 20 and the first housing 10 are configured to be movable relative to each other, and the electrical track assembly 40 and the circuit board assembly 30 are driven to cooperate with each other and trigger the electrical signal. In some embodiments, the second housing 20 is configured to drive one of the electrical track assembly 40 and the circuit board assembly 30 to rotate relative to the first housing 10 and the other of the electrical track assembly 40 and the circuit board assembly 30. For example, the second housing 20 is configured to drive the circuit board assembly 30 to rotate relative to the first housing 10 and the electrical track assembly 40, such that it may be possible to enable a part of the electrical track assembly 40 to be in contact with the circuit board assembly 30, and thus the electrical signal is triggered.

In an embodiment, the second housing 20 is configured to be rotatable relative to the first housing 10, and the electrical track assembly 40 and the circuit board assembly 30 are driven to cooperate with each other and trigger a first electrical signal.

In some embodiments, the second housing 20 is enabled to rotate relative to the first housing 10 by rotating the second housing 20. Since the circuit board assembly 30 is arranged on the inner side of the second housing 20, the circuit board assembly 30 may be enabled to rotate synchronously during the rotation of the second housing 20. In this way, it may be possible to enable the conductive printing layer 33 arranged on a surface of the circuit board assembly 30 close to the electrical track assembly 40 to be in contact with the part of the electrical track assembly 40, and thus the first electrical signal is triggered.

At the same time, the second housing 20 may further be movable radially relative to the first housing 10, that is, a center of the second housing 20 is offset from a center of the first housing 10. In some embodiments, during a process of the second housing 20 rotating relative to the first housing 10, the second housing 20 may further be movable radially relative to the first housing 10. In some embodiments, by pressing the second housing 20, the second housing 20 may be radially close to the first housing 10 in a localized area, such that the electrical track assembly 40 and the circuit board assembly 30 are driven to cooperate with each other and trigger a second electrical signal.

In some embodiments, the first electrical signal may be a signal triggered during a process of rotating the second housing 20. The second electrical signal may be a signal triggered during a process of pressing the second housing 20. A function corresponding to the first electric signal is different from a function corresponding to the second electric signal. In some embodiments, the first electric signal may correspond to an interactive function signal of an interface of the external terminal device 300, such as the page turning, the sliding browsing, etc., and the interactive function signal may be formed by rotation. The second electric signal may correspond to an interactive function signal an interface of the external terminal device 300, such as confirmation, etc., and the interactive function signal may be formed by pressing. In other embodiments, the first electric signal and the second electric signal may be a signal of switching a function of the smart wearable device 100, a signal of adjusting a sound of the smart wearable device 100, and so on, which may be designed as needed. In some embodiments, the second housing 20 may be rotated and pressed separately, that is, a rotating operation and a pressing operation are not simultaneously performed on the second housing 20, such that the rotation operation and the press operation may trigger different functions, respectively. In some embodiments, the second housing 20 may be rotated and pressed at the same time, that is, the rotating operation and the pressing operation are simultaneously performed on the second housing 20. For example, during the process of rotating the second housing 20, a certain pressing force is applied on the second housing 20 at the same time, such that the first electric signal and the second electric signal are triggered at the same time.

Figure 4:
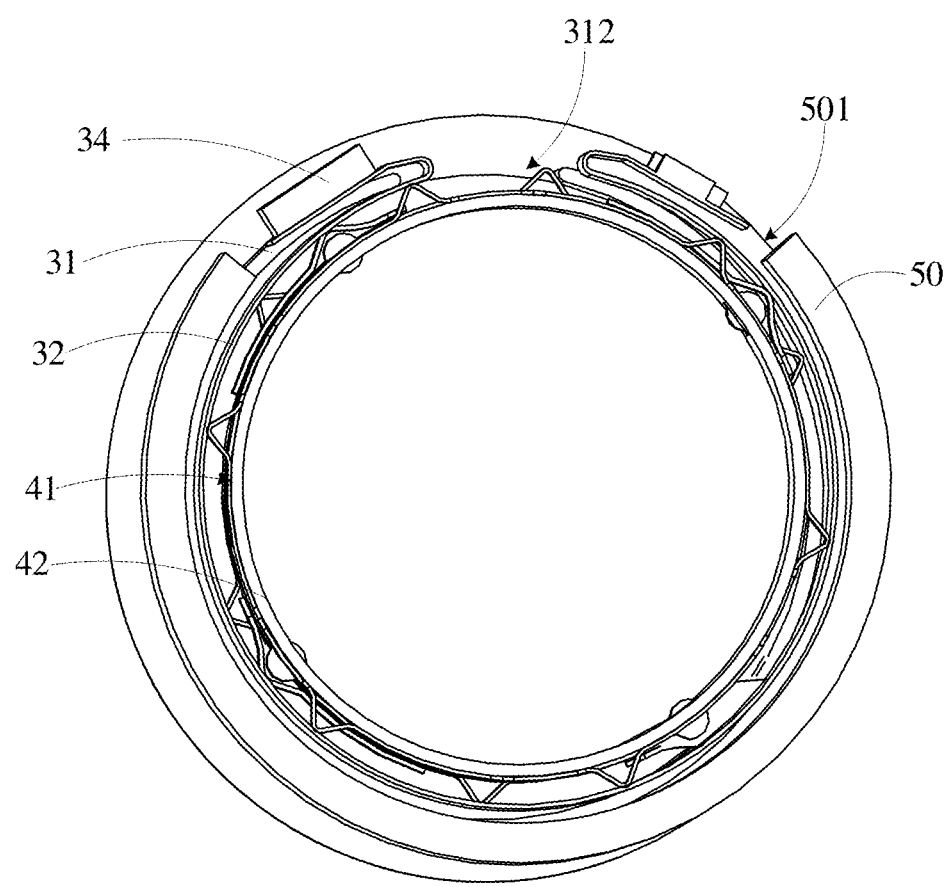
FIG. 4 is an overall structural schematic view of a connecting structure of an electrical track assembly, a circuit board assembly, and a battery according to some embodiments of the present disclosure.
Figure 5:
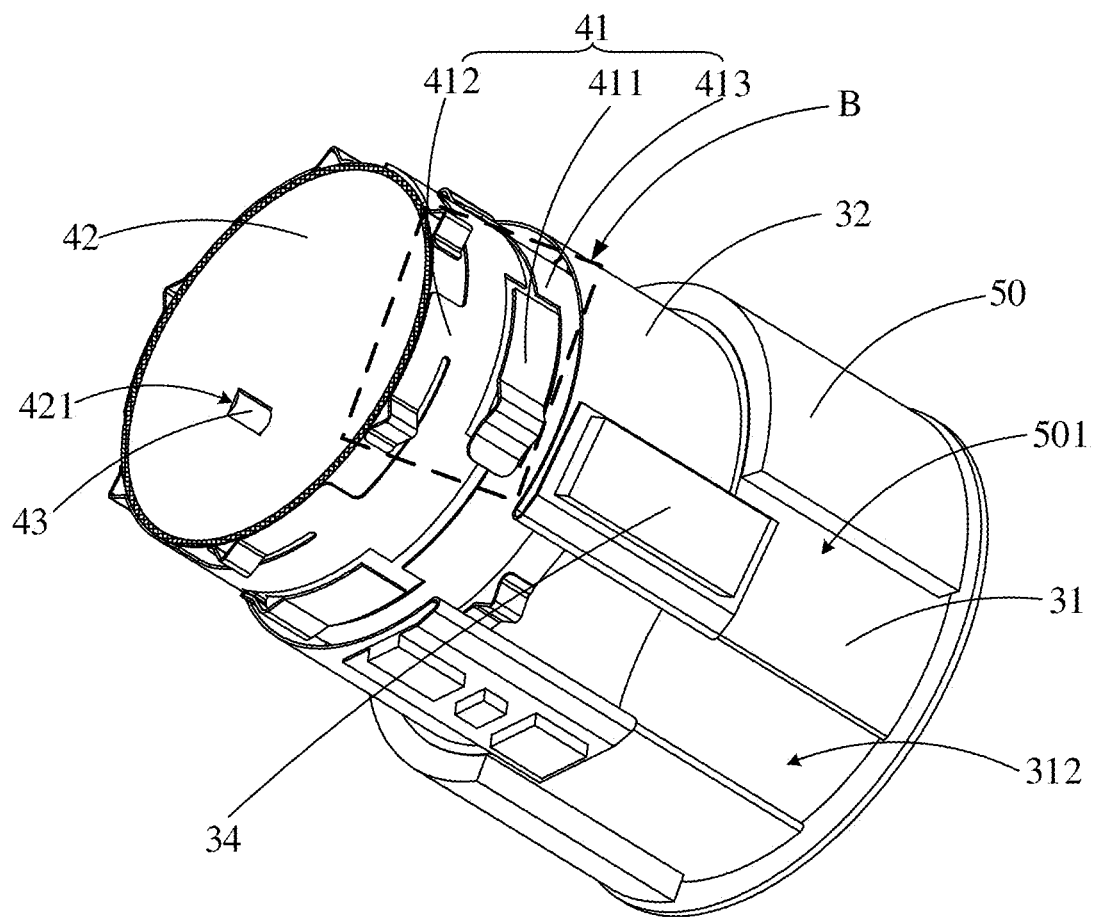
FIG. 5 is a partial exploded schematic view of the electrical track assembly, the circuit board assembly, and the battery according to some embodiments of the present disclosure.
Figure 6:
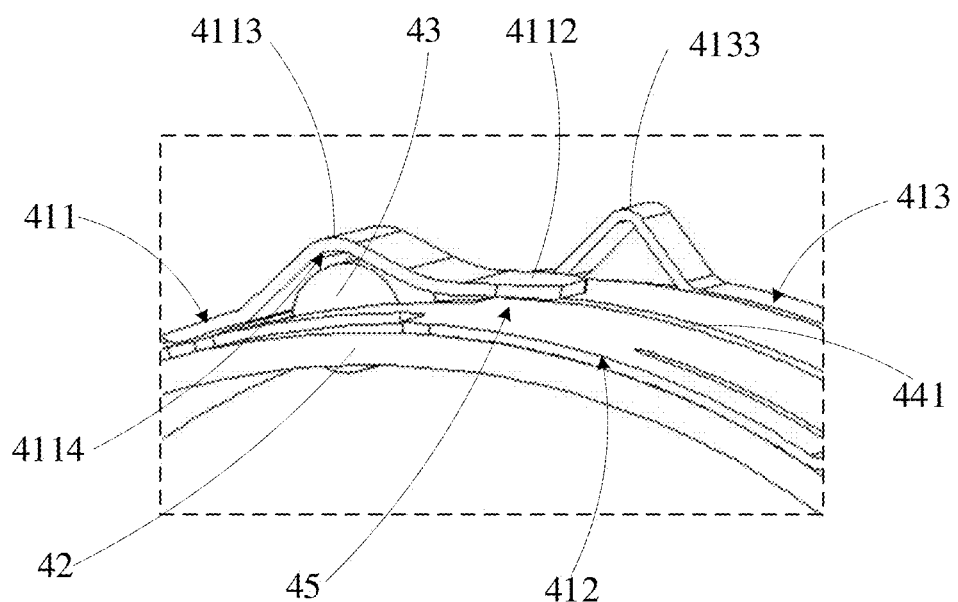
FIG. 6 is an enlarged structural schematic view of a portion B in FIG. 5.
Figure 7:
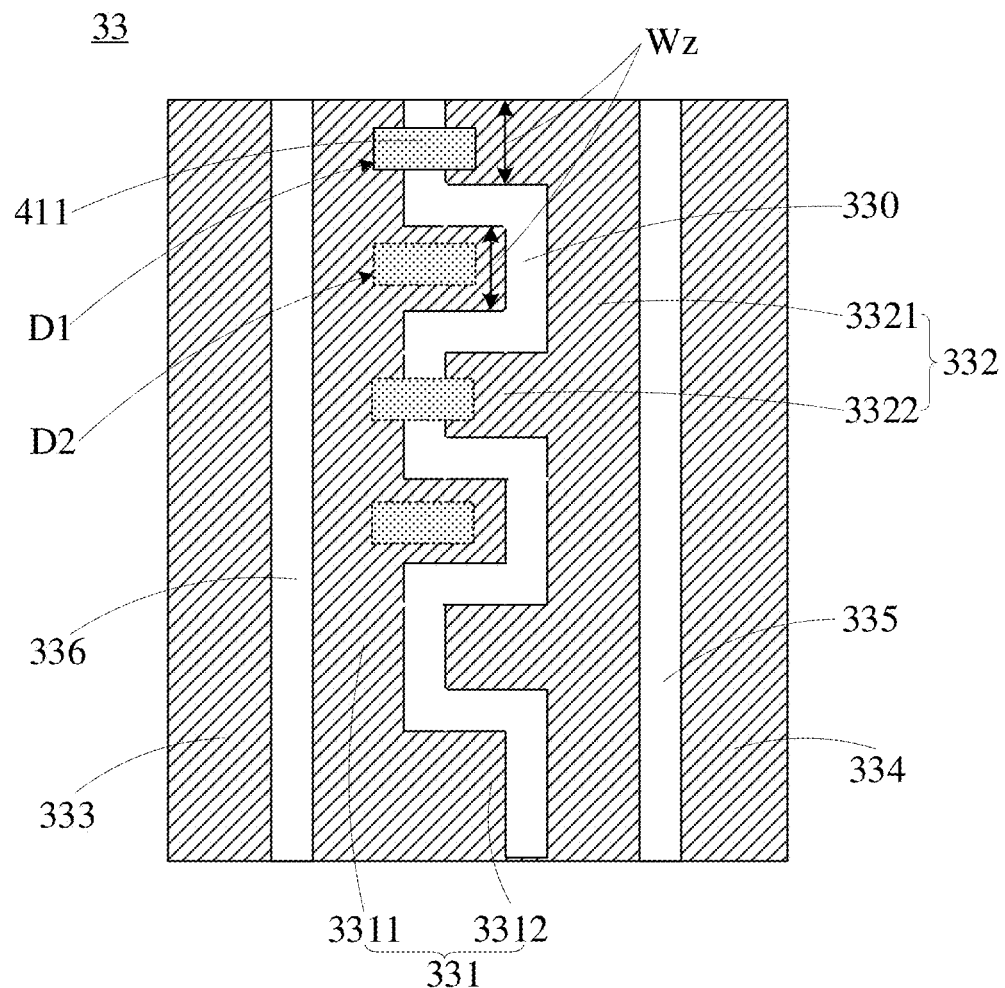
FIG. 7 is an expanded structural schematic view of a conductive printing layer according to a first embodiment of the present disclosure.
Figure 8:
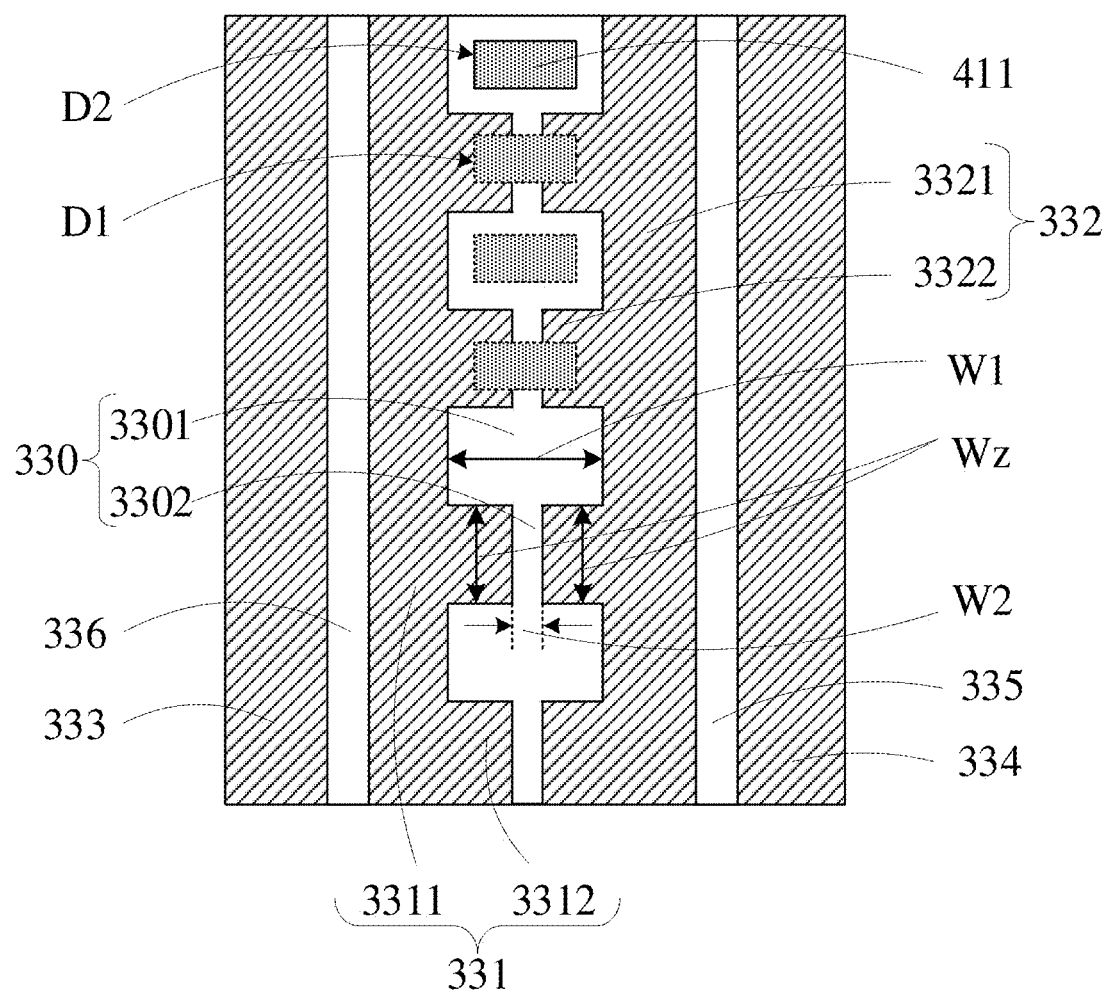
FIG. 8 is an expanded structural schematic view of the conductive printing layer according to a second embodiment of the present disclosure.
Figure 9:
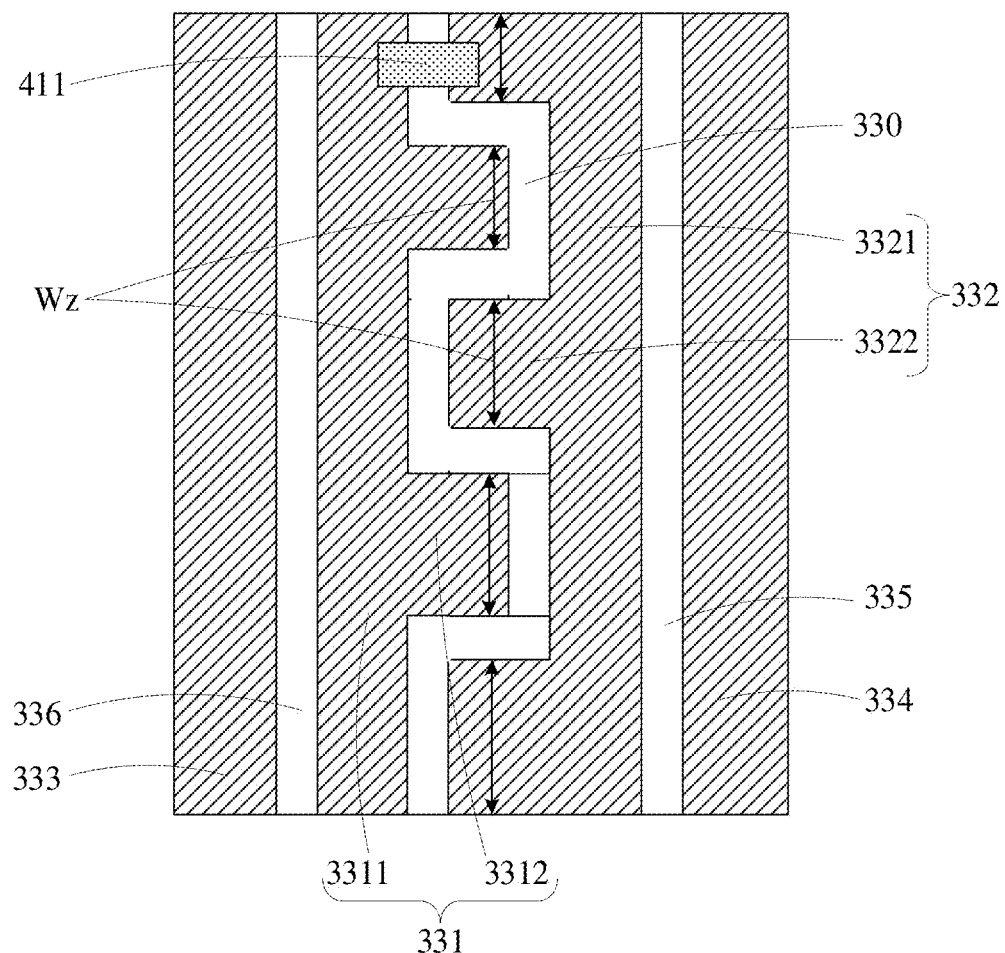
FIG. 9 is another expanded structural diagram of the conductive printing layer according to the first embodiment of the present disclosure.
Figure 10:
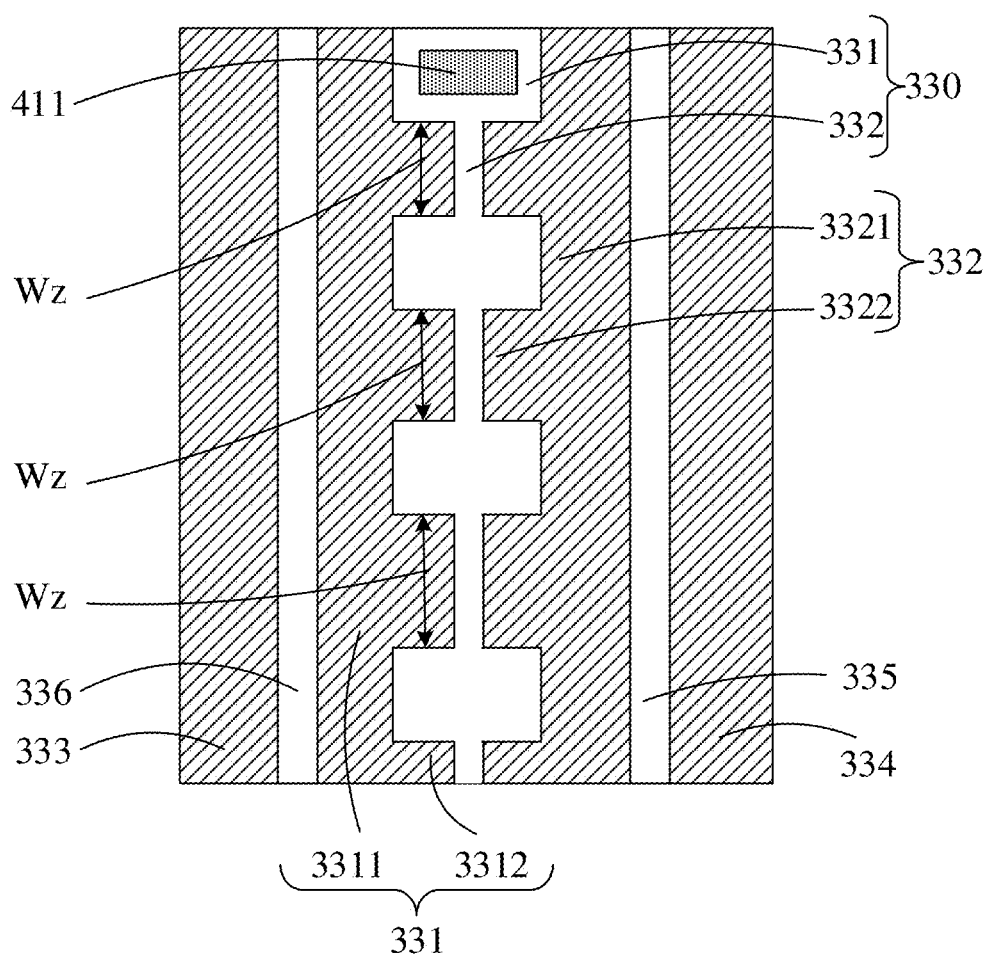
FIG. 10 is another expanded structural diagram of the conductive printing layer according to the second embodiment of the present disclosure.
Figure 11:
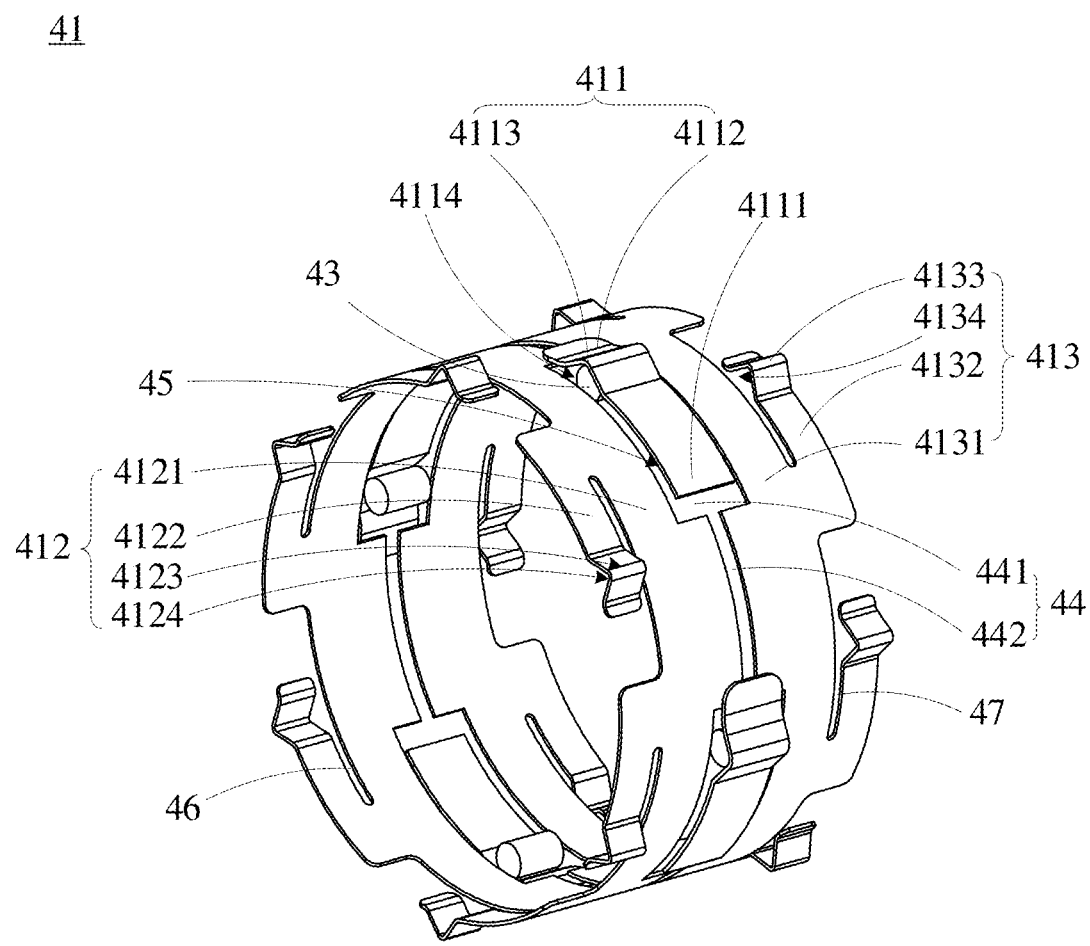
FIG. 11 is a structural schematic view of the electrical track assembly according to some embodiments of the present disclosure.

As shown in FIG. 4 to FIG. 11, FIG. 4 is an overall structural schematic view of a connecting structure of an electrical track assembly, a circuit board assembly, and a battery according to some embodiments of the present disclosure, FIG. 5 is a partial exploded schematic view of the electrical track assembly, the circuit board assembly, and the battery according to some embodiments of the present disclosure, FIG. 6 is an enlarged structural schematic view of a portion B in FIG. 5, FIG. 7 is an expanded structural schematic view of a conductive printing layer according to a first embodiment of the present disclosure, FIG. 8 is an expanded structural schematic view of the conductive printing layer according to a second embodiment of the present disclosure, FIG. 9 is another expanded structural diagram of the conductive printing layer according to the first embodiment of the present disclosure, FIG. 10 is another expanded structural diagram of the conductive printing layer according to the second embodiment of the present disclosure, and FIG. 11 is a structural schematic view of the electrical track assembly according to some embodiments of the present disclosure.

As shown in FIG. 4, FIG. 5 and FIG. 8, the electrical track assembly 40 may include a first track/trace segment 411 and a bracket 42. The bracket 42 is fixedly sleeved on the outer side of the first housing 10. The first track segment 411 moves to a first position D1 to be in contact with the conductive printing layer 33, such that the electrical track assembly 40 may be in contact with and electrically connected to the circuit board assembly 30, and thus the first electric signal or the second electric signal may be triggered.

As shown in FIG. 4 and FIG. 11, in a first implementation, a first end 4111 of the first track segment 411 may be fixedly connected to the bracket 42 by means of clamping, glue bonding, or welding (such as spot welding). The second end 4112 elastically abuts against the conductive printing layer 33.

As shown in FIG. 11, the first track segment 411 may be bent to form two surfaces. One of the two surfaces is a first recess 4114, and the other of the two surfaces is a first protrusion 4113 facing the conductive printing layer 33. The first protrusion 4113 corresponds to the first recess 4114. The first protrusion 4113 protrudes towards a direction away from the bracket 42, and the first protrusion 4113 elastically abuts against the conductive printing layer 33, such that the first track segment 411 may be electrically connected to the conductive printing layer 33. In some embodiments, the first protrusion 4113 may be a protruding section or a protruding point.

A plurality of first track segments 411 are arranged at intervals along a periphery of the bracket 42. For the each of the plurality of first track segments 411, in some embodiments, the first track segment 411 is disposed on a center position of the bracket 42 in an axial direction. In some embodiments, the first end 4111 of the first track segment 411 is fixed on the bracket 42, and a second end 4112 of the first track segment 411 naturally tilts up without being subjected to an external force. The second end 4112 of the first track segment 411 is pressed down under the external force, such that the first protrusion 4113 may be in contact with the conductive printing layer 33, and thus the first track segment 411 elastically abuts against the conductive printing layer 33.

In a second implementation, for each of the plurality of first track segments 411, an elastic member 43 may further be arranged between the first track segment 411 and the bracket 42. The second end 4112 of the first track segment 411 may be driven to elastically abut against the conductive printing layer 33 through the elastic member 43. In some embodiments, the elastic member 43 may elastically abut against the first protrusion 4113. By arranging the elastic member 43, it may be possible to reduce a case that the first protrusion 4113 cannot be restored to a natural state when the first protrusion 4113 is deformed after being pressed for many times and is not subjected to the external force. In some embodiments, when the elastic member 43 is compressed, the first track segment 411 elastically abuts against the conductive printing layer 33, such that the first track segment 411 may be electrically connected to the conductive printing layer 33. When the elastic member 43 returns to a natural state, the elastic member 43 supports the second end 4112 of the first track segment 411, such that the first track segment 411 may move in a direction away from the conductive printing layer 33, and thus the first track segment 411 and the conductive printing layer 33 are in a disconnected state. In some embodiments, the elastic member 43 may be an elastic piece, or an elastic column. For example, the elastic member 43 may be made of rubber, plastic, or elastic metal. In some embodiments, an overall shape of the elastic member 43 may be column-shaped, cylindrical, or frustum-shaped. The elastic member 43 may be made of an insulating material. In some embodiments, when a material of the elastic member 43 and a material of the bracket 42 are metal materials, an insulation layer (not shown) needs to be arranged between the elastic member 43 and the bracket 42, so as to prevent the short circuit from occurring between the elastic member 43 and the bracket 42. Similarly, when the material of the bracket 42 the metal material, an insulation layer needs to be arranged between the first track segment 411 and the bracket 42, so as to prevent the short circuit from occurring between the first track segment 411 and the bracket 42. In the embodiments, the bracket 42 may be made of the insulating material, and the first track segment 411 may be made of the metal material. The bracket 42 may be an annular bracket, so as to facilitate the installation with other annular components. In some embodiments, the bracket 42 may be formed by splicing a plurality of arc-shaped portions (not shown), which is not limited herein.

It should be understood that, one of the above-mentioned two implementations may be selected, or both thereof may be selected. That is, the first end 4111 of the first track segment 411 is fixed connected to the bracket 42, and the elastic member 43 is arranged between the second end 4112 and the bracket 42, which may be set as needed and is not limited herein.

In an embodiment, the first track segment 411 is arranged on the elastic member 43 and is engaged with the elastic member 43. The first track segment 411 (i.e., the second end 4112) is suspended on a side of the bracket 42 away from a first fixing segment/portion 4121 and a second fixing segment/portion 4131 to define a second gap 45.

In some embodiments, an opening 421 is defined on the bracket 42. A part of the elastic member 43 is embedded in the opening 421, and another part of the elastic member 43 protrudes out of the opening 421 and is engaged in the first recess 4114. In some embodiments, the elastic member 43 is matched with the first recess 4114, such that the first track segment 411 is fixed stably and firmly. The opening 421 may be a through hole or a blind hole. In the embodiments, the opening 421 is the through hole. The elastic member 43 is clamped with the bracket 42 through the through hole. Since a thickness of the bracket 42 is relatively thin, the elastic member 43 may further pass through the through hole to abut against the first housing 10, thereby improving stability when the elastic member 43 may be fixed.

As shown in FIGS. 7-8, in some embodiments, the conductive printing layer 33 may include a first electrical area 331 and a second electrical area 332 insulated from each other. Each of the first electrical area 331 and the second electrical area 332 extends along the periphery of the second housing 20 and is arc-shaped. In the embodiments, each of the first electrical area 331 and the second electrical area 332 may be a major arc.

In the embodiments, since the electrical track assembly 40 is arranged on the outer side of the first housing 10, the first track segment 411 is enabled to rotate relative to the conductive printing layer 33 during the process of the second housing 20 rotating relative to the first housing 10. In this way, the first track segment 411 is driven to move alternately between a first position D1 and a second position D2, such that the first electrical area 331 and the second electrical area 332 are alternately switched between a disconnected state and a connected state in which the first electrical area 331 is electrically connected to the second electrical area 332 by the first track segment 411. That is, when the first track segment 411 is driven to rotate by the first housing 10, the first track segment 411 is enabled to move along an extending direction of the first electrical area 331 and the second electrical area 332. When the first track segment 411 is moved to the first position D1, two ends of the first track segment 411 are simultaneously connected to the first electrical area 331 and the second electrical area 332, respectively, that is, one end of the first track segment 411 is connected to the first electrical area 331 and another end of the first track segment 411 is connected to the second electrical area 332 simultaneously, such that the first electrical area 331 is electrically connected to the second electrical area 332 by the first track segment 411. When the first track segment 411 is moved to the second position D2, the first track segment 411 is connected to only one of the first electrical area 331 and the second electrical area 332. Alternatively, when the first track segment 411 is moved to a position where neither the first electrical area 331 nor the second electrical area 332 is connected to the first track segment 411, such as the second position D2, the first electrical area 331 cannot be electrically connected to the second electrical area 331, that is, the third electrical area 333 and the fourth electrical area 334 are in the disconnected state. In some embodiments, as shown in FIGS. 8-11, the first position D1 herein refers to a position where the first electrical area 331 is enabled to be electrically connected to the second electrical area 332 by the first track segment 411 during a process of the first track segment 411 moving along the extending direction of the first electrical area 331 and the second electrical area 332. The first position D1 is not unique. The second position D2 herein refers to a position where the first electrical area 331 cannot be electrically connected to the second electrical area 331 by the first track segment 411 during the process of the first track segment 411 moving along the extending direction of the first electrical area 331 and the second electrical area 332. The second position D2 is not unique.

In an embodiment, as shown in FIGS. 7 to 8, the first electrical area 331 may include a first strip-shaped portion 3311 and a plurality of first protruding portions 3312. For each of the plurality of first protruding portions 3312, the first protruding portion 3312 is connected to a side of the first strip-shaped portion 3311 close to the second electrical area 332. The second electrical area 332 may include a second strip-shaped portion 3321 and a plurality of second protruding portions 3322. For each of the plurality of second protruding portions 3322, the second protruding portion 3322 is connected to a side of the second strip-shaped portion 3321 close to the first electrical area 331. As shown in FIG. 7, in some embodiments, the plurality of first protruding portions 3312 and the plurality of second protruding portions 3322 are alternately arranged periodically and spaced apart from each other along a first direction (i.e., a peripheral direction). In some embodiments, for the each of the plurality of first protruding portions 3312 and the each of the plurality of second protruding portions 3322, the first protruding portion 3312 and the second protruding portion 3322 may be alternately arranged one by one along the first direction. In this way, an arrangement way where the plurality of first protruding portions 3312 and the plurality of second protruding portions 3322 are alternately arranged periodically may be in a form of ABAB . . . B, in case that the first protruding portion 3312 is regarded as A and the second protruding portion 3322 is regarded as B. In some embodiments, one first protruding portion 3312 and a group of several second protruding portions 3322 may be alternately arranged periodically along the first direction. The number of the several second protruding portions 3322 may be at least two. In this way, an arrangement way where the plurality of first protruding portions 3312 and the plurality of second protruding portions 3322 are alternately arranged periodically may be in a form of ABBABB . . . B, or ABBBABBB . . . B, etc., which is not limited herein and may be adjusted according to actual needs. In some embodiments, a group of several first protruding portions 3312 and one second protruding portion 3322 may be alternately arranged periodically along the first direction. The number of the several first protruding portions 3312 may be at least two. In this way, an arrangement way where the plurality of first protruding portions 3312 and the plurality of second protruding portions 3322 are alternately arranged periodically may be in a form of AABAAB . . . B, or AAABAAAB . . . B, etc., which is not limited herein, and may be adjusted according to actual needs. It should be noted that the terms "A" and "B" described above are used to distinguish different objects, and are not intended to describe a specific order, which may be adjusted according to actual needs. In addition, the first protruding portion 3312 and the second protruding portion 3322 may further be spaced apart from each other along the first direction. In some embodiments, as shown in FIG. 8, the plurality of first protruding portions 3312 and the plurality of second protruding portions 3322 are oppositely arranged in pairs along the peripheral direction. For example, for the each of the plurality of first protruding portions 3312 and the each of the plurality of second protruding portions 3322, two first protruding portions 3312 and two second protruding portions 3322 may be oppositely arranged in pairs along the peripheral direction. In some embodiments, the peripheral direction may be referred to a peripheral direction of any one of the first housing 10, the second housing 20, the third housing 31, the circuit board 32, the battery 50, and the annular cover plate 60.

For the each of the plurality of first protruding portions 3312 and the each of the plurality of second protruding portions 3322, in some embodiments, a peripheral width Wz of the first protruding portion 3312 may be the same as or different from a peripheral width Wz of the second protruding portion 3322. In an embodiment, the peripheral width Wz of the first protruding portion 3312 is the same as the peripheral width Wz of the second protruding portion 3322. A shape of the first protruding portion 3312 may be the same as or different from a shape of the second protruding portion 3322. Each of the first protruding portion 3312 and the second protruding portion 3322 may have a rectangular shape, an arc-shaped shape, a triangular shape, etc., which is not limited herein. In the embodiments, the shape of the first protruding portion 3312 is the same as the shape of the second protruding portion 3322, such that the first protruding portion 3312 may be connected and conductive to the second protruding portion 3322 by the first track segment 411 during the rotating of the first track segment 411.

In a first embodiment, as shown in FIG. 7, a third barrier area 330 is arranged between the first electrical area 331 and the second electrical area 332. The third barrier area 330 is arranged in a meandering manner. The third barrier area 330 is periodically arranged along the first direction (i.e., the peripheral direction), and electrically insulates the first electrical area 331 from the second electrical area 332. The meandering arrangement may be understood as that an edge of the third barrier 330 extends in a non-linear manner. For the each of the plurality of first protruding portions 3312 and the each of the plurality of second protruding portions 3322, in some embodiments, an irregular third barrier area 330 is arranged between the first protruding portion 3312 and the second protruding portion 3322, such that the first protruding portion 3312 is insulated from the second protruding portion 3322 in an insulating barrier manner. In some embodiments, as shown in FIG. 7, the third barrier area 330 has a constant width along the first direction and is arranged in the meandering manner.

As shown in FIG. 8, in a second embodiment, the third barrier area 330 may include a plurality of first sub barrier areas 3301 and a plurality of second sub barrier areas 3302. The plurality of first sub barrier areas 3301 and the plurality of second sub barrier areas 3302 are alternately arranged. In some embodiments, the plurality of first sub barrier areas 3301 and the plurality of second sub barrier areas 3302 may be alternately arranged periodically along the peripheral direction. In some embodiments, for each of the plurality of first sub barrier areas 3301 and each of the plurality of second sub barrier areas 3302, the first sub barrier area 3301 and the second sub barrier area 3302 may be alternately arranged one by one. In this way, an arrangement way where plurality of first sub barrier areas 3301 and the plurality of second sub barrier areas 3302 may be alternately arranged periodically may be in a form of CDCD . . . D, in case that the first sub barrier area 3301 is regarded as C and the second sub barrier area 3302 is regarded as D. In some embodiments, one first sub barrier area 3301 and a group of several second sub barrier areas 3302 may be alternately arranged periodically along the peripheral direction. The number of the several second sub barrier areas 3302 may be at least two. In this way, an arrangement way where plurality of first sub barrier areas 3301 and the plurality of second sub barrier areas 3302 may be alternately arranged periodically may be in a form of CDDCDD . . . D, or CDDDCDDD . . . D, etc., which is not limited herein and may be adjusted according to actual needs. In some embodiments, a group of several first sub barrier areas 3301 and one second sub barrier area 3302 may be alternately arranged periodically along the peripheral direction. The number of the several first sub barrier areas 3301 may be at least two. In this way, an arrangement way where plurality of first sub barrier areas 3301 and the plurality of second sub barrier areas 3302 may be alternately arranged periodically may be in a form of CCDCCD . . . D, or CCCDCCCD . . . D, etc., which is not limited herein and may be adjusted according to actual needs. It should be noted that the terms "C" and "D" described above are used to distinguish different objects, and are not intended to describe a specific order, which may be adjusted according to actual needs. For the each of the plurality of first sub barrier areas 3301 and the each of the plurality of second sub barrier areas 3302, a width of the first sub barrier area 3301 is greater than a width of the second sub barrier area 3302. In some embodiments, the width of the first sub barrier area 3301 (i.e., a first width W1) refers to a width capable of allowing a case where the first track segment 411 cannot be in contact with at least one of the first electrical area 331 and the second electrical area 332 when the first track segment 411 moves along the extending direction of the first electrical area 331 and the second electrical area 332, which enables the first electrical area 331 and the second electrical area 332 to be in the disconnected state. The width of the second sub barrier area 3302 (i.e., a second width W2) refers to a width capable of allowing a case where the first track segment 411 is enabled to be in contact with the first electrical area 331 and the second electrical area 332 to achieve electrical connection when the first track segment 411 moves along the extending direction of the first electrical area 331 and the second electrical area 332, such that the first electrical area 331 and the second electrical area 332 are in an electrically connected state. In some embodiments, the first width W1 of the first sub barrier area 3301 along the peripheral direction may be greater than a width of the first track segment 411 when setting the first sub barrier 3301. The second width W2 of the second sub barrier area 3302 along the peripheral direction may be less than the width of the first track segment 411 when setting the second sub barrier area 3302. A specific width value of each of the first width W1 and the second width W2 may be designed as needed, which is not limited herein. In some embodiments, the third barrier area 330 is an axisymmetric pattern.

In an embodiment, as shown in FIG. 10, an extending direction of the first strip-shaped portion 3311 is the same as an extending direction of the second strip-shaped portion 3321. Along the extending direction of the first strip-shaped portion 3311 and the second strip-shaped portion 3321, a distance between two adjacent first protruding portions 3312 gradually increases, and a distance between two adjacent second protruding portions 3322 gradually increases.

In some embodiments, along the extending direction of the first strip-shaped portion 3311 and the second strip-shaped portion 3321, the distance between the two adjacent first protruding portions 3312 gradually increasing may be the same as or different from the distance between the two adjacent second protruding portions 3322 gradually increasing. In the embodiments, the distance between the two adjacent first protruding portions 3312 gradually increasing may be the same as the distance between the two adjacent second protruding portions 3322 gradually increasing, such that a size of the first protruding portion 3312 is consistent with a size of the second protruding portion 3322 opposite to the first protruding portion 3312. In this way, the first track segment 411 may be simultaneously in contact with the first protruding portion 3312 and the second protruding portion 3322 during the moving of the first track segment 411, such that the first electrical area 331 may be electrically connected to the second electrical area 332. In some embodiments, a change trend of the distance between the two adjacent first protruding portions 3312, as well as a change trend of the distance between the two adjacent second protruding portions 3322, may further be configured to determine a rotation direction of the second housing 20 of the smart wearable device 100. In some embodiments, if the distance between the two adjacent first protruding portions 3312 gradually increases and the distance between the two adjacent second protruding portions 3322 gradually increases, a time interval during which the first electrical area 331 is electrically connected to the second electrical area 332 by the first track segment 411 gradually increases, and it is determined that the second housing 20 rotates clockwise. If the distance between the two adjacent first protruding portions 3312 gradually decreases and the distance between the two adjacent second protruding portions 3322 gradually decreases, the time interval during which the first electrical area 331 is electrically connected to the second electrical area 332 by the first track segment 411 gradually decreases, and it is determined that the second housing 20 rotates counterclockwise. In this way, the rotation direction of the second housing 20 may be determined, so as to reduce an occurrence of false touch, thereby improving touch accuracy.

For each of the plurality of first protruding portion portions 3312 and each of the plurality of second protruding portion portions 3322, in some embodiments, as shown in FIG. 9, a length of the first protruding portion 3312 gradually increases along the extending direction of the first strip-shaped portion 3311 and the second strip-shaped portion 3321, and a length of the second protruding portion 3322 gradually increases along the extending direction of the first strip-shaped portion 3311 and the second strip-shaped portion 3321. Similarly, in addition to determining the rotation direction of the second housing 20 by the change trend of the distance between the two adjacent first protruding portions 3312 and the change trend of the distance between the two adjacent second protruding portions 3322, the rotation direction of the second housing 20 may further be determined by a change trend of the length of the first protruding portion 3312 and a change trend of the length of the second protruding portion 3322. In some embodiments, if the length of the first protruding portion 3312 gradually increases and the length of the second protruding portion 3322 gradually increases, a time interval during which the first electrical area 331 is electrically connected to the second electrical area 332 by the first track segment 411 gradually increases, and it is determined that the second housing 20 rotates clockwise. If the length of the first protruding portion 3312 gradually decreases and the length of the second protruding portion 3322 gradually decreases, the time interval during which the first electrical area 331 is electrically connected to the second electrical area 332 by the first track segment 411 gradually decreases, and it is determined that the second housing 20 rotates counterclockwise. In this way, the rotation direction of the second housing 20 may be determined, so as to reduce the occurrence of false touch, thereby improving the touch accuracy.

In an embodiment, the conductive printing layer 33 may further include a third electrical area 333 and a fourth electrical area 334 insulated from each other. Each of the third electric area 333 and the fourth electric area 334 extends along the periphery of the second housing 20 and is arc-shaped. In the embodiments, each of the third electrical area 333 and the fourth electrical area 334 may be a major arc.

In an embodiment, as shown in FIGS. 7-8, the third electrical area 333 is disposed on a side of the first electrical area 331 away from the second electrical area 332 along the axial direction, and the third electrical area 333 is insulated from the first electrical area 331. The fourth electrical area 334 is disposed on a side of the second electrical area 332 away from the first electrical area 331 along the axial direction, and the fourth electrical area 334 is insulated from the second electrical area 332. That is, the third electrical area 333 and the fourth electrical area 334 may be disposed on opposite sides of an overall area formed by the first electrical area 331 and the second electrical area 332, respectively. In some embodiments, the first strip-shaped portion 3311 of the first electrical area 331, the second strip-shaped portion 3321 of the second electrical area 332, the third electrical area 333, and the fourth electrical area 334 are arranged side by side in the axial direction. At the same time, for the each of the plurality of first protruding portion portions 3312 and the each of the plurality of second protruding portion portions 3322, the irregular third barrier area 330 is arranged between the first protruding portion 3312 and the second protruding portion 3322, and the first electrical area 331 may be insulated from the second electrical area 332 through the irregular third barrier 330 in an insulating barrier manner. A first barrier area 336 and a second barrier area 335 are arranged between the third electrical area 333 and the fourth electrical area 334. The first electrical area 331 may be insulated from the third electrical area 333 through the first barrier area 336 in an insulating barrier manner. The second electrical area 332 may be insulated from the fourth electrical area 334 through the second barrier area 335 in an insulating barrier manner. In the embodiments, the first barrier area 336 is disposed substantially parallel to the second barrier area 335. The third electrical area 333 is disposed substantially parallel to the fourth electrical area 334. The first barrier area 336 and the second barrier area 335 may be extended irregularly or regularly. In the embodiments, the first barrier area 336 and the second barrier area 335 may be extended regularly, for example, each of the first barrier area 336 and the second barrier area 335 has a rectangular shape.

Accordingly, as shown in FIGS. 4-11, the electrical track assembly 40 may further include a second track/trace segment 412 and a third track/trace segment 413, the second track segment 412 is electrically connected to the third electrical area 333, and the third track segment 413 is electrically connected to the fourth electrical area 334. The first track segment 411 is enabled to switch between an initial state and a pressed state. When the first track segment 411 is in the initial state (i.e., the first track segment 411 is in the second position D2), the first track segment 411 is not in contact with at least one of the second track segment 412 and the third track segment 413. Therefore, the second track segment 412 and the third track segment 413 are in the disconnected state, such that the third electrical area 333 and the fourth electrical area 334 are in the disconnected state. When the first track segment 411 is in the pressed state (i.e., the first track segment 411 is in the first position D1), the first track segment 411 is in contact with the second track segment 412 and the third track segment 413, respectively, such that the third electrical area 333 is electrically connected to the fourth electrical area 334. At the same time, during a process of the second housing 20 moving radially relative to the first housing 10, the first track segment 411 is enabled to switch to the press state, such that the third electrical area 333 is electrically connected to the fourth electrical area 334 by the first track segment 411.

In some embodiments, the first track segment 411, the second track segment 412, and the third track segment 413 may cooperatively form a trace pad/trackpad 41. The trackpad 41 may have an annular shape, such as a polygonal shape, a circular shape, an elliptical shape, etc. In some embodiments, the trackpad 41 may have a rectangular shape, such as a cuboid, etc. For example, the trackpad 41 may be an annular trackpad. In some embodiments, a periphery of the trackpad 41 may be in a closed shape. In some embodiments, the periphery of the trackpad 41 may be in an open shape. When the first track segment 411 is in the initial state (i.e., the first track segment 411 is in the second position D2), the second track segment 412 cannot be electrically connected to the third track segment 413 by the first track segment 411. Therefore, even if the second track segment 412 is electrically connected to the third electrical area 333 and the third track segment 413 is electrically connected to the fourth electrical area 334, the third electrical area 333 cannot be electrically connected to the fourth electrical area 334 by the first track segment 411. When the first track segment 411 is in the pressed state (i.e., the first track segment 411 is in the first position D1), the first track segment 411 may be simultaneously in contact with the second track segment 412 and the third track segment 413, such that the second track segment 412 may be electrically connected to the third track segment 413. In addition, since the second track segment 412 is electrically connected to the third electrical area 333 and the third track segment 413 is electrically connected to the fourth electrical area 334, the third electrical area 333 is indirectly conductive to the fourth electrical area 334 by the first track segment 411. In this way, the entire electrical track assembly 40 and the conductive printing layer 33 are in the electrically connected state, such that the first electrical signal and the second electric signal may be triggered to achieve a corresponding function.

In some embodiments, if the bracket 42 is made of metal, an insulating layer (not shown) needs to be covered on a part of an outer sidewall of the second track segment 412 and a part of an outer sidewall of the third track segment 413, so as to reduce an occurrence of short circuit due to a case that the second track segment 412 and the third track segment 413 are electrically connected to the bracket 42.

In an embodiment, during the process of the second housing 20 rotating relative to the first housing 10, the second track segment 412 and the third track segment 413 may be enabled to rotate relative to the conductive printing layer 33, the second track segment 412 may keep in contact with the third electrical area 333, and the third track segment 413 may keep in contact with the fourth electrical area 334. That is, during the process of the second track segment 412 and the third track segment 413 rotating relative to the conductive printing layer 33, the second track segment 412 may keep electrically connected to the third electrical area 333 all the time, and the third track segment 413 may keep electrically connected to the fourth electrical area 334 all the time.

In an embodiment, the second track segment 412 may include a first fixing segment 4121 and a plurality of first elastic pieces 4122. The first fixing segment 4121 is fixedly sleeved on the bracket 42. For each of the plurality of first elastic pieces 4122, the first elastic piece 4122 is connected to the first fixing segment 4121. A third gap 46 is defined between the first elastic piece 4122 and the first fixing segment 4121. The plurality of first elastic pieces 4122 may be annularly arranged on a side of the first fixing segment 4121 away from the third track segment 413. The first elastic piece 4122 elastically abuts against the third electrical area 333. A manner of the first elastic piece 4122 elastically abutting against the third electrical area 333 may be understood as that the first elastic piece 4122 is similar to a cantilever arranged on a side of the first fixing segment 4121, such that the first elastic piece 4122 may be close to or away from the third electrical area 333.

For each of the plurality of first elastic pieces 4122, in an embodiment, as shown in FIG. 11, one end of the first elastic piece 4122 is connected to a side edge of the first fixing segment 4121 away from the second fixing segment 4131, and the other end of the first elastic piece 4122 is bent to form a second recess 4124 and a second protrusion 4123 facing the conductive printing layer 33. The second protrusion 4123 elastically abuts against the third electrical area 333 to achieve electrical connection. In some embodiments, the second protrusion 4123 may be a protruding section or a protruding point. In some embodiments, each of the first fixing segment 4121 and the second fixing segment 4131 may have an annular shape or an arc-shaped shape. Specifically, the first fixing segment 4121 may be a first fixing arc, and the second fixing segment 4131 may be a second fixing arc. In some embodiments, the number of first fixing segments 4121 may be multiple. The multiple first fixing segments 4121 may cooperatively form an annular structure. In some embodiments, the multiple first fixing segments 4121 may also cooperatively form an arc-shaped structure. In some embodiments, a distance between each adjacent two first fixing segments 4121 may be equal, i.e., the multiple first fixing segments 4121 may be arranged equally spaced. In this way, a same first timing signal may be generated during a process that the second protrusion 4123 is electrically connected to the third electrical area 333. In some embodiments, the distance between each adjacent two first fixing segments 4121 may be unequal, i.e., the multiple first fixing segments 4121 may be arranged at non-equal spacing. In this way, different first timing signals may be generated during the process that the second protrusion 4123 is electrically connected to the third electrical area 333. In some embodiments, some of the multiple first fixing segments 4121 may be arranged equally spaced, and the remaining part of the multiple first fixing segments 4121 may be arranged non-equally spaced, which may be adjusted as actual needs.

In an embodiment, the third track segment 413 may include a second fixing segment 4131 and a plurality of second elastic pieces 4132. The second fixing segment 4131 is fixedly sleeved on the bracket 42. For each of the plurality of second elastic pieces 4132, the second elastic piece 4132 is connected to the second fixing segment 4131. A fourth gap 47 is defined between the second elastic piece 4132 and the second fixing segment 4131. The second fixing segment 4131 may be disposed substantially parallel to the first fixing segment 4121. The second elastic piece 4132 is disposed on a side of the second fixing segment 4131 away from the first fixing segment 4121. One end of the second elastic pieces 4132 is connected to a side edge of the second fixing segment 4131 away from the first fixing segment 4121, and the other end of the second elastic piece 4132 is bent to form a third recess 4134 and a third protrusion 4133 facing the conductive printing layer 33. The third protrusion 4133 elastically abuts against the fourth electrical area 334 to achieve electrical connection. In some embodiments, the third protrusion 4133 may be a protruding section or a protruding point. In some embodiments, the number of second fixing segments 4131 may be multiple. The multiple second fixing segments 4131 may cooperatively form an annular structure. In some embodiments, the multiple second fixing segments 4131 may also cooperatively form an arc-shaped structure. In some embodiments, a distance between each adjacent two second fixing segments 4131 may be equal, i.e., the multiple second fixing segments 4131 may be arranged equally spaced. In this way, a same second timing signal may be generated during a process that the third protrusion 4133 is electrically connected to the fourth electrical area 334. In some embodiments, the distance between each adjacent two second fixing segments 4131 may be unequal, i.e., the multiple second fixing segments 4131 may be arranged at non-equal spacing. In this way, different second timing signals may be generated during the process that the third protrusion 4133 is electrically connected to the fourth electrical area 334. In some embodiments, some of the multiple second fixing segments 4131 may be arranged equally spaced, and the remaining part of the multiple second fixing segments 4131 may be arranged non-equally spaced, which may be adjusted as actual needs.

During a process of the second track segment 412 and the third track segment 413 rotating relatively to the conductive printing layer 33, the plurality of first elastic pieces 4122 are respectively in contact with the third electrical area 333 to achieve electrical connection, and the plurality of second elastic pieces 4132 are respectively in contact with the fourth electrical area 334 to achieve electrical connection.

In an embodiment, each of the first fixing segment 4121 and the second fixing segment 4131 is annular and is sleeved on an outer side of the bracket 42. The plurality of first elastic pieces 4122 are arranged at intervals along a periphery of the first fixing segment 4121. The plurality of second elastic piece 4132 are arranged at intervals along a periphery of the second fixing segment 4131. The plurality of second elastic pieces 4132 may be annularly arranged on a side of the second fixing segment 4131 away from the second track segment 412, and the plurality of second elastic pieces 4132 elastically abut against the fourth electrical area 334. A principle of the second elastic piece 4132 elastically abutting against the fourth electrical area 334 herein is the same as that of the first elastic piece 4122 elastically abutting against the third electrical area 333. Each of the second protrusion 4123 and the third protrusion 4133 protrudes towards the direction away from the bracket 42, and a protruding height of the each of the second protrusion 4123 and the third protrusion 4133 is greater than a protruding height of the first fixing segment 4121.

In the embodiments, a structure of the second track segment 412 may be the same as that of the third track segment 413, and the second track segment 412 and the third track segment 413 are arranged symmetrically. The first fixing segment 4121 and the second fixing segment 4131 are arranged close to each other and remain in non-contact with each other. The second track segment 412 and the third track segment 413 are symmetrically arranged along the axial direction. In some embodiments, the second track segment 412 and the third track segment 413 are arranged in a centrosymmetric manner. In some embodiments, the second track segment 412 and the third track segment 413 are arranged symmetrically, and a first gap 44 is defined between the second track segment 412 and the third track segment 413. The first track segment 411 is arranged in the first gap 44, and the first track segment 411 is not in contact with the second track segment 412 and the third track segment 413 when the first track segment 411 is in the initial state.

In some embodiments, a first gap 44 is defined between the first fixing segment 4121 and the second fixing segment 4131. One end of the first track segment 411 passes through the first gap 44 and is fixedly connected to the bracket 42, and the other end of the first track segment 411 is suspended on a side away from the bracket 42 of the first fixing segment 4121 and the second fixing segment 4131 to define the second gap 45. It should be understood that, as shown in FIG. 6 and FIG. 11, the first gap 44 may refer to a gap reserved between the first fixing segment 4121 and the second fixing segment 4131 when the first fixing segment 4121 and the second fixing segment 4131 are symmetrically arranged. The second gap 45 may refer to a gap defined when the first track segment 411 is not in contact with the bracket 42 in a radial direction.

In the embodiments, each of the first fixing segment 4121 and the first elastic piece 4122 is a metal piece and integrally formed. Each of the second fixing segment 4131 and the second elastic piece 4132 is a metal piece and integrally formed. It should be understood that an arrangement way of integrally forming facilitates manufacturing, and the use firmness of a component may be improved at the same time.

In some embodiments, as shown in FIG. 6 and FIG. 11, the first gap 44 may include a plurality of first sub-gaps 441 and a plurality of second sub-gaps 442. The plurality of first sub-gaps 441 and the plurality of second sub-gaps 442 are alternately arranged along the peripheral direction. In some embodiments, the plurality of first sub-gaps 441 and the plurality of second sub-gaps 442 may be alternately arranged periodically along the peripheral direction. In some embodiments, for each of the plurality of first sub-gaps 441 and each of the plurality of second sub-gaps 442, the first sub-gap 441 and the second sub-gap 442 are alternately arranged one by one along the peripheral direction. In this way, an arrangement way where the plurality of first sub-gaps 441 and the plurality of second sub-gaps 442 may be alternately arranged periodically may be in a form of EFEF . . . F, in case that the first sub-gap 441 is regarded as E and the second sub-gap 442 is regarded as F. In some embodiments, one first sub-gap 441 and a group of several second sub-gaps 442 are alternately arranged along the peripheral direction. The number of the several second sub-gaps 442 may be at least two. In this way, an arrangement way where the plurality of first sub-gaps 441 and the plurality of second sub-gaps 442 may be alternately arranged periodically may be in a form of EFFEFF . . . F, or EFFFEFFF . . . F, etc., which is not limited herein and may be adjusted according to actual needs. In some embodiments, a group of several first sub-gaps 441 and one second sub-gap 442 are alternately arranged along the peripheral direction. The number of the several first sub-gaps 441 may be at least two. In this way, an arrangement way where the plurality of first sub-gaps 441 and the plurality of second sub-gaps 442 may be alternately arranged periodically may be in a form of EEFEEF . . . F, or EEEFEEEF . . . F, etc., which is not limited herein and may be adjusted according to actual needs. It should be noted that the terms "E" and "F" described above are used to distinguish different objects, and are not intended to describe a specific order, which may be adjusted according to actual needs. A width of the first sub-gap 441 is greater than a width of the second sub-gap 442, so as to accommodate the first track segment 411. In this way, a gap may be defined between the first track segment 411 and the second track segment 412 and another gap may be defined between the first track segment 411 and the third track segment 413 when the first track segment 411 is in the initial state. An opening 421 is defined on a position of the bracket 42 corresponding to a corresponding first sub-gap 441. The elastic member 43 is partially embedded in the opening 421. A structure of the opening 421 is as described above, which will not be described herein. One end of the first track segment 411 passes through the first sub-gap 441 and is fixedly connected to the bracket 42, and the other end of the first track segment 411 is suspended on a side of the bracket 42 away from a second sub-gap 442.

In an embodiment, as shown in FIG. 2 and FIGS. 7-8, the circuit board assembly 30 may include a circuit board 32 and a third housing 31. The third housing 31 is sleeved between the first housing 10 and the second housing 20. The circuit board 32 includes a control circuit (not shown). The control circuit is configured to generate a first control signal according to a case that the first electrical area 331 and the second electrical area 332 are in the disconnected state or in the electrically connected state. The control circuit is further configured to generate a second control signal according to a case that the third electrical area 333 and the fourth electrical area 334 are in the disconnected state or in the electrically connected state. In some embodiments, the control circuit is configured to generate a third control signal according to a combination of the case that the first electrical area 331 and the second electrical area 332 are in the disconnected state or in the electrically connected state and the case that the third electrical area 333 and the fourth electrical area 334 are in the disconnected state or in the electrically connected state.

In some embodiments, the control circuit may be configured to control the disconnected state or the electrically connected state between the first electrical area 331 and the second electrical area 332, and control the disconnected state or the electrically connected state between the third electrical area 333 and the fourth electrical area 334, respectively. In this way, the first electrical area 331 is electrically connected to the second electrical area 332 to generate the first control signal, and the third electrical area 333 is electrically connected to the fourth electrical area 334 to generate the second control signal, respectively. In some embodiments, the control circuit may further be configured to simultaneously control the disconnected state or the electrically connected state between the first electrical area 331 and the second electrical area 332, as well as the disconnected state or the electrically connected state between the third electrical area 333 and the fourth electrical area 334, so as to generate the third control signal. Each of the first electric signal and the second electric signal may include at least one of the first control signal, the second control signal, and the third control signal. Each of the first control signal, the second control signal, and the third control signal may be corresponding to different functions as needed, such as adjusting the volume, liking, opening/closing an application, etc., which may be arranged may be determined at will and is not limited herein.

Figure 12:
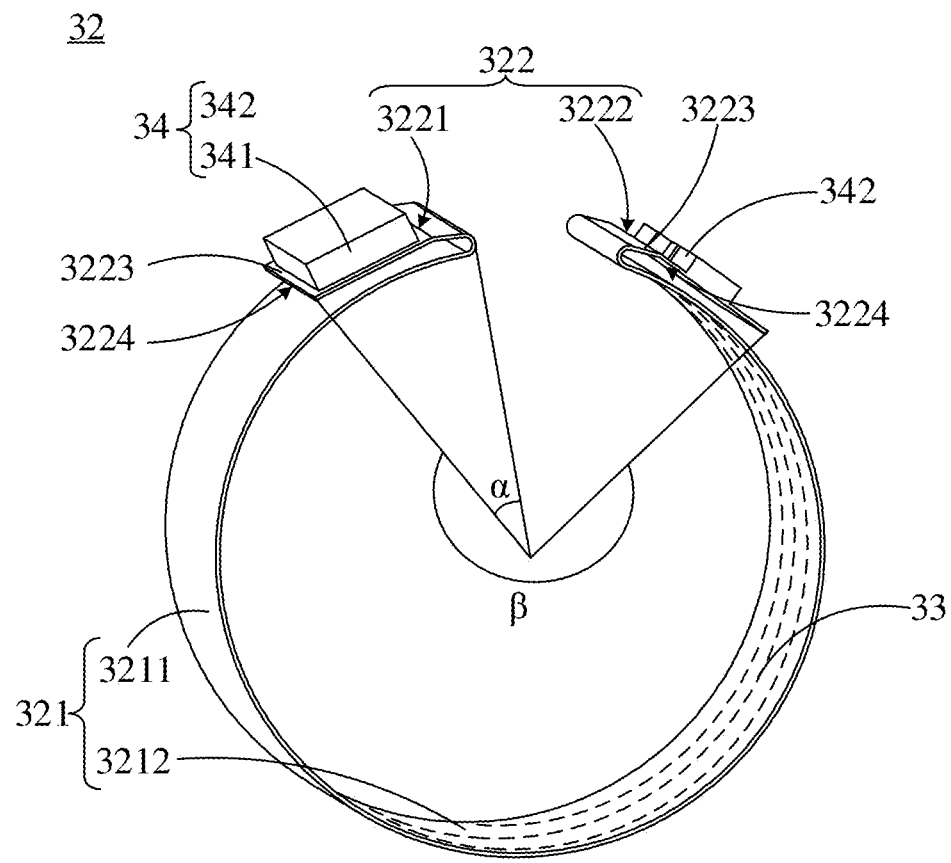
FIG. 12 is a structural schematic view of a circuit board according to some embodiments of the present disclosure.

As shown in FIG. 12, FIG. 12 is a structural schematic view of a circuit board according to some embodiments of the present disclosure.

In an embodiment, as shown in FIG. 12, the circuit board assembly 30 may further include a flexible substrate and an electrical assembly 34 arranged on the flexible substrate. The flexible substrate may be configured as the circuit board 32. The flexible substrate may include a first surface 3211 and a second surface 3212 disposed oppositely. Each of first electrical area 331, the second electrical area 332, the third electrical area 333, and the fourth electrical area 334 are electrically connected to the electrical assembly 34. Each of the first electrical area 331, the second electrical area 332, the third electrical area 333, and the fourth electrical area 334 includes the conductive printing layer 33 that is disposed on a same layer as the first surface 3211. The flexible substrate is configured to allow to be bent into an arc shape. Each of the first electrical area 331, the second electrical area 332, the third electrical area 333, and the fourth electrical area 334 faces an inside of the arc shape, such that the electrical assembly 34 faces an outer side away from the second surface 3212.

The circuit board 32 made of the flexible substrate may further include a main body segment/portion 321 and a bending segment/portion 322 flexibly connected to each other. A conductive printing layer 33 is arranged on a surface of the main body segment 321 away from the third housing 31, that is, the conductive printing layer 33 is arranged on a surface of the main body segment 321 facing the electrical track assembly 40. The electrical assembly 34 is arranged on a surface of the bending segment 322 away from the third housing 31. The conductive printing layer 33 is electrically connected to the electrical assembly 34. The bending segment 322 is configured to allow to bend relative to the main body segment 321 and enable the electrical assembly 34 to be positioned on a side opposite to the conductive printing layer.

In some embodiments, the main body segment 321 has a first surface 3211 and a second surface 3212 disposed oppositely. The conductive printing layer 33 is arranged on the first surface 3211. In the embodiments, the second surface 3212 of the main body segment 321 is not arranged with a component. The bending segment 322 has a third surface 3223 and a fourth surface 3224. The electrical assembly 34 may be disposed on the third surface 3223 or the fourth surface 3224. In the embodiments, the electrical assembly 34 may be disposed on the third surface 3223, and the fourth surface 3224 is not arranged with a component. Meanwhile, the second surface 3212 of the main body segment 321 and the fourth surface 3224 of the bending segment 322 are arranged at intervals and disposed oppositely.

In an embodiment, the main body segment 321 has flexibility. Alternatively, the main body segment 321 has rigidity and is arc-shaped. In some embodiments, the main body segment 321 and the bending segment 322 may be integrally formed by bending a flexible conducting material. Alternatively, each of the main body segment 321 and the bending segment 322 may be made into an arc-shaped segment through a rigid material. A curvature of the main body segment 321 is greater than that of the bending segment 322.

In some embodiments, as shown in FIG. 4, a first notch 312 is defined on the third housing 31. The main body segment 321 is annularly arranged on an inner side of the third housing 31. The bending segment 322 extends from the first notch 312 and is arranged on an outer side of the third housing 31 after being bent. The main body segment 321 and the bending segment 322 are arranged at intervals and disposed oppositely. In some embodiments, the main body segment 321 is annularly arranged around a periphery of the third housing 31, that is, the main body segment 321 is annularly arranged on the outer side of the third housing 31. The bending segment 322 extends from the first notch 312 and is arranged on the inner side of the third housing 31 after being bent. The main body segment 321 and the bending segment 322 are arranged at intervals and disposed oppositely. The electrical assembly 34 is arranged on a surface of the bending segment 322 away from the third housing 31. That is, a position where the main body segment 321 is arranged on the inner side/outer side of the third housing 31 and a position where the bending segment 322 is arranged on the inner side/outer side of the third housing 31 may be interchanged as needed. The bending segment 322 may be bent from the inner side to the outer side relative to the third housing 31, or from the outer side to the inner side relative to the third housing 31, as long as it may realize the function of the circuit board 32 and may be easily to be connected to the electrical assembly 34, a specific arrangement way and a bending direction of which are not limited herein.

In an embodiment, as shown in FIG. 12, the circuit board 32 may include a first bending segment/portion 3221 and a second bending segment/portion 3222. The first bending segment 3221 is flexibly connected to one end of the main body segment 321, and the second bending segment 3222 is flexibly connected to the other end of the main body segment 321. The first bending segment 3221 extends from one side of the first notch 312 and is arranged on the outer side of the third housing 31 after being bent. A first electrical component 341 is arranged on a surface of the first bending segment 3221 away from the third housing 31. The second bending segment 3222 extends from the other side of the first notch 312 and is arranged on the outer side of the third housing 31 after being bent. A second electrical component 342 is arranged on a surface of the second bending segment 3222 away from the third housing 31. A structure of the first bending segment 3221 may the same as that of the second bending segment 3222. The first bending segment 3221 and the second bending segment 3222 may be configured to be arranged with different electrical components. Each of the first electrical component 341 and the second electrical component 342 may include at least one of a main control chip, a driving circuit, a communication circuit, a capacitor, a resistor, and an inductor. The first electrical component 341 and the second electrical component 342 are evenly distributed on opposite sides of the main body segment 321, such that the weight distribution of the circuit board 32 may be balanced, thereby ensuring the weight balance of the smart wearable device 100. In other embodiments, other electrical components may be set as needed, which is not limited herein.

In some embodiments, the main body segment 321 may be annularly arranged on the inner side of the third housing 31. The first bending segment 3221 extends from the one side of the first notch 312 and is arranged on the outer side of the third housing 31 after being bent. The second bending segment 3222 extends from the other side of the first notch 312 and is arranged on the outer side of the third housing 31 after being bent. In some embodiments, the main body segment 321 is annularly arranged around the periphery of the third housing 31, that is, the main body segment 321 is annularly arranged on the outer side of the third housing 31. The first bending segment 3221 extends from the one side of the first notch 312 and is arranged on the inner side of the third housing 31 after being bent. The second bending segment 3222 extends from the other side of the first notch 312 and is arranged on the inner side of the third housing 31 after being bent. An arrangement way of each of the first bending segment 3221 and the second bending segment 3222 may refer to an arrangement way of the bending segment 322 as described above, which will not be repeated herein. In addition, the curvature of the main body segment 321 is greater than that of each of the first bending segment 3221 and the second bending segment 3222.

In an embodiment, a central angle $\alpha$ between two ends of the bending segment 322 is in a range from 20° to 60°, and a central angle $\beta$ between two ends of the main body segment 321 is greater than 180°. That is, a radian of the main body segment 321 is a major arc. It should be noted that is, the central angle $\beta$ is a central angle between two ends of a periphery of an orthographic projection area of the main body segment 321. In some embodiments, the central angle $\alpha$ between the two ends of each of the first bending segment 3221 and the second bending segment 3222 is in the range from 20° to 60°, such as 30°, 60°, etc.

In an embodiment, as shown in FIG. 4, the smart wearable device 100 may further include a battery 50. The battery 50 is mounted on a periphery of the orthographic projection area of the main body segment 321 and the bending segment 322. In addition, the battery 50 is annularly arranged around on a periphery of the third housing 31, that is, the battery 50 is annularly arranged on the outer side of the third housing 31, and the battery 50 is electrically connected to the circuit board 32. The battery 50 may be an annular battery. The battery 50 may be a disposable battery or a rechargeable battery. When the battery 50 is the rechargeable battery, the battery 50 may be a wired rechargeable battery or a wireless rechargeable battery. The wired rechargeable battery may be a battery charged through a wired line. The wireless rechargeable battery may be a battery charged through a wireless coil. The rechargeable battery 50 may further be configured to support the fast charging technology.

In an embodiment, a second notch 501 is defined on the battery 50. In some embodiments, an opening size of the first notch 312 is smaller than an opening size of the second notch 501, such that the bending segment 322 and the electrical assembly 34 are disposed in the opening defined by the second notch 501. Each of the first notch 312 and the bending segment 322 may be exposed through the second notch 501.

In an embodiment, a sealing layer (not shown) is arranged between the bracket 42 and the second housing 20 along the peripheral direction. It should be understood that the sealing layer is sealed and connected to the bracket 42 and the second housing 20, respectively. That is, a sealing layer is arranged on two opposite sides of the bracket 42 along axial direction and two opposite sides of the second housing 20 along the axial direction. In addition, the sealing layer extends along a peripheral direction relative to the bracket 42 and the second housing 20, so as to achieve sealing. The sealing layer may be a plastic plate, or may be formed by curing epoxy resin. In some embodiments, the sealing layer, the bracket 42, and the second housing 20 may cooperatively define a sealing space. Electrical components, such as the circuit board assembly 30, the electrical track assembly 40, etc., are disposed in the sealing space, such that it may effectively waterproof and seal the electrical assembly 34 disposed inside, thereby reducing a risk of damage caused by water entering the electrical assembly 34. In some embodiments, the sealing layer may further be arranged on opposite sides of the third housing 31 and opposite sides of the bracket 42 along the peripheral direction. As shown in FIG. 3, a second annular flange 22 is arranged on one end of the inner side of the second housing 20, and a third annular flange 311 is arranged on the other end of the outer side of the third housing 31. The second annular flange 22 and the third annular flange 311 are disposed on opposite ends of the battery 50 along the axial direction, so as to limit the battery 50 and the bending segment 322. In some embodiments, the second housing 20 is sealed and connected to the third housing 31. For example, the second annular flange 22 is sealed and connected to the third housing 31 through the second annular flange 22 and the third annular flange 311, respectively. In some embodiments, the second annular flange 22 and the third annular flange 311 may be sealed and connected to the second housing 20 and the third housing 31 by using sealing rubber rings or glue, respectively, so as to providing waterproof protection for the battery 50 disposed inside. In some embodiments, the second annular flange 22 and the third annular flange 311 may be arranged on opposite ends of the inner side of the second housing 20, or opposite ends of the outer side of the third housing 31, such that it may also achieve the function of limiting the battery 50 and the bending segment 322. In the embodiments, the second annular flange 22 is arranged on the one end of the inner side of the second housing 20, and the third annular flange 311 is arranged on the other end of the outer side of the third housing 31, such that the circuit board 32 may be directly sleeved when mounting the circuit board 32. In this way, it may be possible to reduce a problem of mutual interference and poor clamping when a plurality of annular and arc-shaped members are mounted.

In an embodiment, as shown in FIGS. 2-3, the smart wearable device 100 may further include an annular cover plate 60. The annular cover plate 60 is sleeved on one end of the outer side of the first housing 10. A first annular flange 12 is arranged on the other end of the outer side of the first housing 10. The first annular flange 12 and the annular cover plate 60 are configured to limit the second housing 20 along the axial direction, so as to prevent the second housing 20 from falling off along the axial direction. In some embodiments, the first annular flange 12 and the annular cover plate 60 may further be integrally arranged on the opposite ends of the outer surface of the first housing 10, so as to limit the second housing 20 along the axial direction. In the embodiments, the annular cover plate 60 and the first housing 10 are arranged and installed separately, so as to facilitate installation and disassembly. A preparation material of the annular cover plate 60 may be the same as that of the first housing 10, such as an insulating material.

Figure 13:
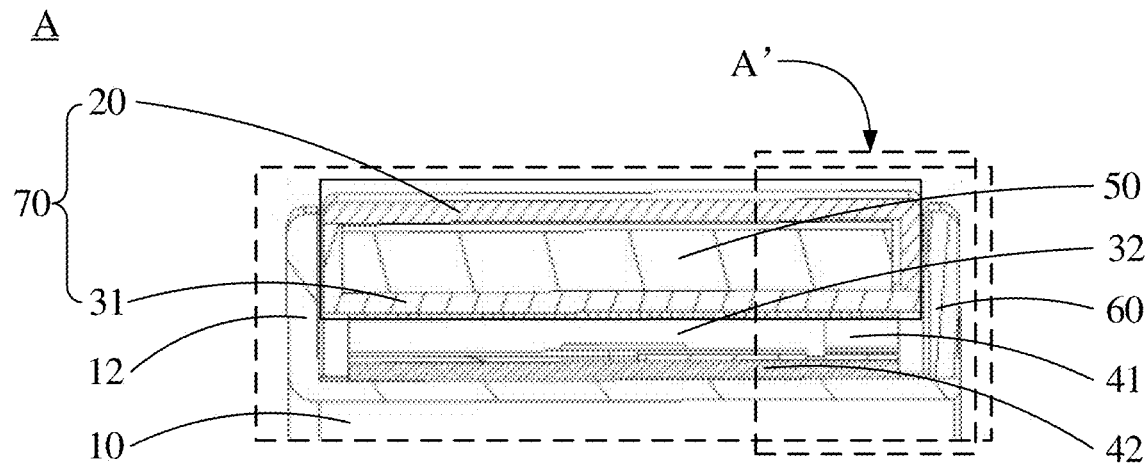
FIG. 13 is an enlarged structural schematic view of a portion A in FIG. 3.
Figure 14:
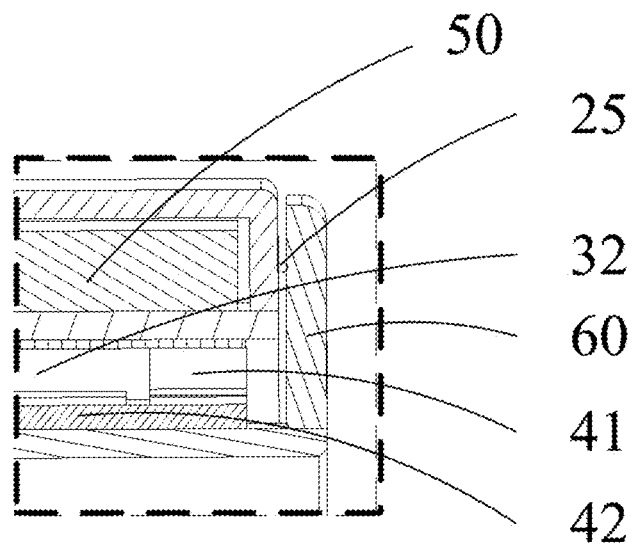
FIG. 14 is an enlarged structural schematic view of a first structure of a portion A' shown in FIG. 13.
Figure 15:
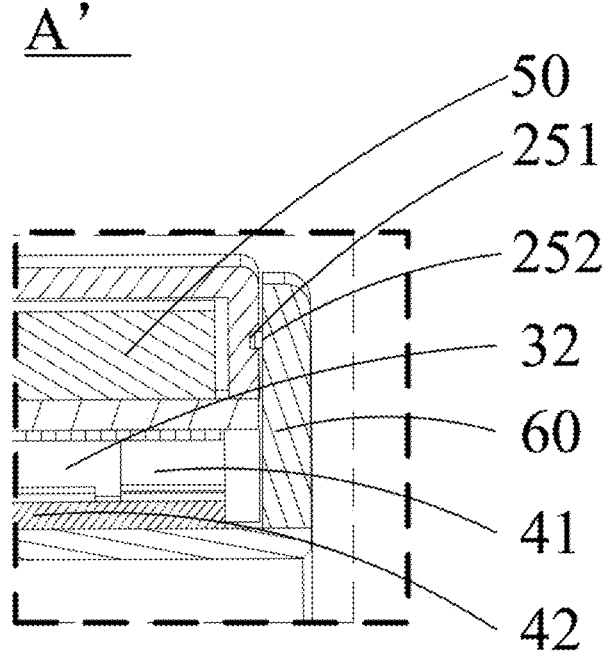
FIG. 15 is an enlarged structural schematic view of a second structure of the portion A' shown in FIG. 13.
Figure 16:
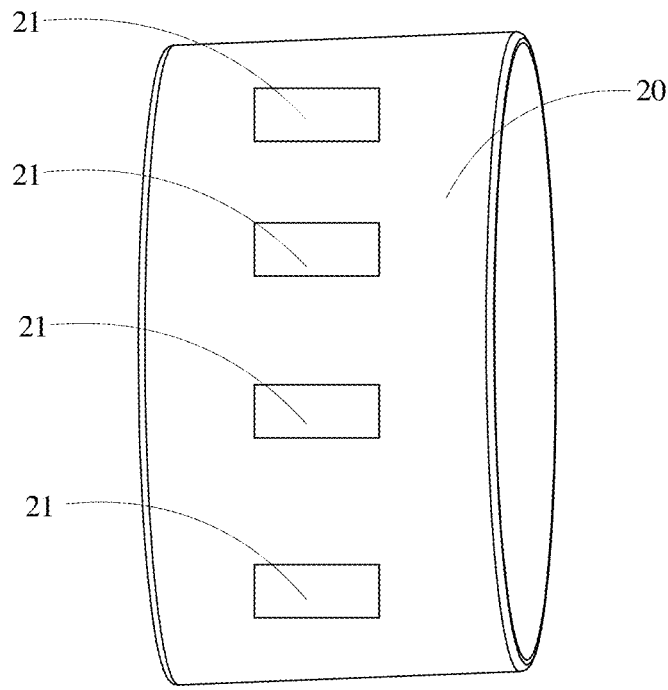
FIG. 16 is a structural schematic view of a second housing and a touch electrode according to some embodiments of the present disclosure.

As shown in FIGS. 13-16, FIG. 13 is an enlarged structural schematic view of a portion A in FIG. 3, FIG. 14 is an enlarged structural schematic view of a first structure of a portion A' shown in FIG. 13, FIG. 15 is an enlarged structural schematic view of a second structure of the portion A' shown in FIG. 13, and FIG. 16 is a structural schematic view of a second housing and a touch electrode according to some embodiments of the present disclosure.

In a first embodiment, as shown in FIG. 3 and FIG. 13, the second housing 20 is matched with the third housing 31 to form a rotating housing 70. The battery 50 is arranged in the rotating housing 70, and the circuit board 32 is arranged on the third housing 31. In this way, the circuit board 32 and the battery 50 may further rotate as the second housing 20 and the third housing 31 rotate relative to each other. An axial length of the rotating housing 70 is less than a distance between the first annular flange 12 and the annular cover plate 60, such that a fifth gaps 81 is defined between the rotating housing 70 and the first annular flange 12, and another fifth gaps 81 is defined between the rotating housing 70 and the annular cover plate 60, thereby facilitating the rotation of the rotating housing 70. As shown in FIG. 14, a ball 25 may further be arranged in two fifth gaps 81 to reduce friction, so as to further facilitate rotation of the rotating housing 70.

In a second embodiment, as shown in FIG. 3 and FIG. 15, a first clamping portion 251 is arranged on an end of the rotating housing 70. A second clamping portion 252 is arranged on at least one of the first annular flange 12 and the annular cover plate 60. The second clamping portion 252 is matched with the first clamping portion 251. One of the first clamping portion 251 and the second clamping portion 252 is a protruding section or a protruding point (not shown), and the other of the first clamping portion 251 and the second clamping portion 252 is a groove (not shown). The protruding portion is clamped with the groove, such that the first clamping portion 251 may be matched with the second clamping portion 252. The number of at least one of the first clamping portion 251 and the second clamping portion 252 is multiple. A plurality of first clamping portions 251 or a plurality of second clamping portion 252 are arranged at intervals along the peripheral direction. During a process of the second housing 20 rotating relative to the first housing 10, a matching between the second clamping portion 252 and the first clamping portion 251 is periodically switched. In some embodiments, the number of first clamping portions 251 is one, and the number of second clamping portions 252 is multiple. For each of the multiple second clamping portions 252, during the process of the second housing 20 rotating relative to the first housing 10, since the first housing 10 does not rotate, the first clamping portion 251 is enabled to switch from an engagement state with a current second clamping portion 252 to another engagement state with a next second clamping portion 252 every time the rotating housing 70 rotates, and so on.

In another embodiment, as shown in FIG. 3 and FIG. 16, a plurality of touch electrodes 21 may be arranged on an outer side of the second housing 20. The plurality of touch electrodes 21 are arranged at intervals along a periphery of the second housing 20, and are electrically connected to the circuit board assembly 30, respectively. The circuit board assembly 30 may be configured to determine a rotation direction of the second housing 20 through an order in which the plurality of touch electrodes 21 are touched by the user. For each of the plurality of touch electrodes 21, in some embodiments, a distance between adjacent touch electrodes 21 is different from each other. When a rotation direction is clockwise, a distance between the adjacent touch electrodes 21 gradually increases. When the rotation direction is anti-clockwise, the distance between the two adjacent touch electrodes 21 gradually decreases. In this way, the rotation direction of the second housing 20 may be determined, so as to reduce the occurrence of false touch, thereby improving the touch accuracy.

In some embodiments, each of the first housing 10, the second housing 20, and the third housing 31 may have an annular shape, such as a polygonal shape, a circular shape, an elliptical shape, etc. In some embodiments, each of the first housing 10, the second housing 20, and the third housing 31 may have a rectangular shape, such as a cuboid, etc. For example, each of the first housing 10, the second housing 20, and the third housing 31 may be an annular housing. In some embodiments, a periphery of each of the first housing 10, the second housing 20, and the third housing 31 may be in a closed shape. In some embodiments, the periphery of each of the first housing 10, the second housing 20, and the third housing 31 may be in an open shape. In some embodiments, the smart wearable device 100 may be a smart ring, a ring, a bracelet, a watch, a pedometer, a smart band, etc., which is not limited herein.

Figure 17:
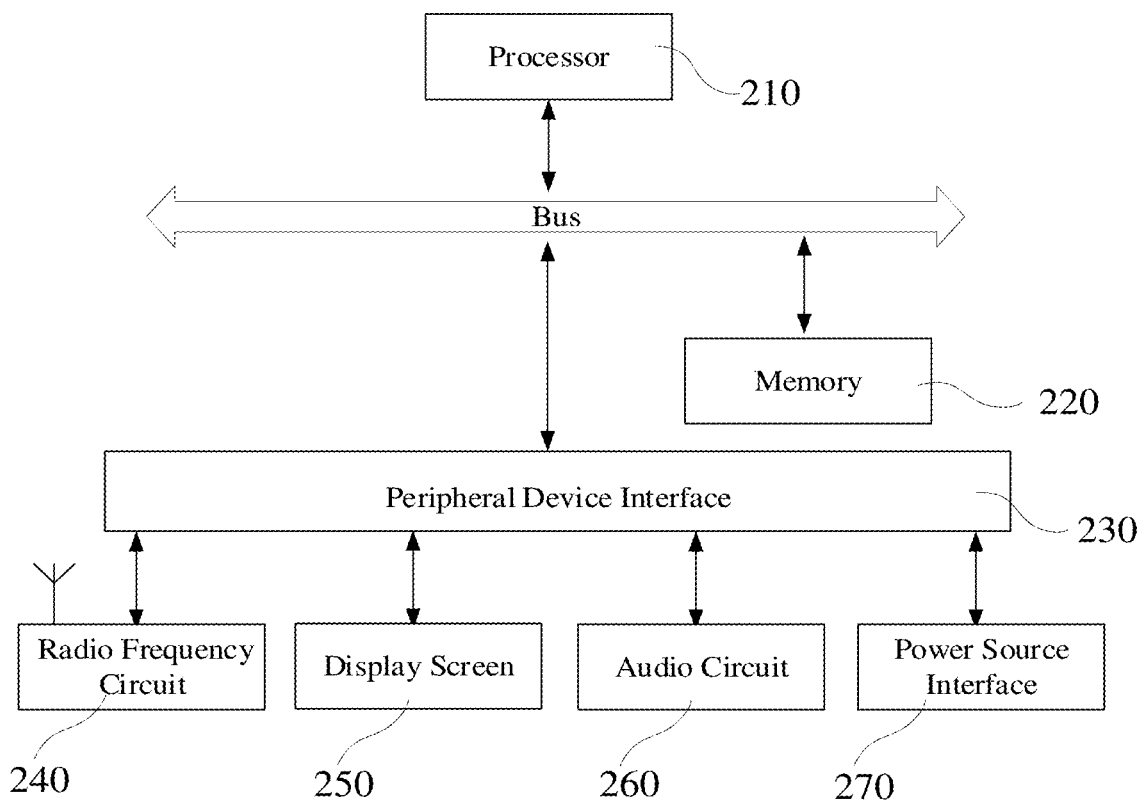
FIG. 17 is a schematic view of a module connecting of the smart wearable device according to some embodiments of the present disclosure.

As shown in FIG. 17, FIG. 17 is a schematic view of a module connecting of the smart wearable device according to some embodiments of the present disclosure.

In an embodiment, the smart wearable device 100 may further include a processor 210 and a memory 220. The memory 220 is coupled to the processor 210.

The processor 210 is configured to control an operation of the smart wearable device 100. The processor 210 may also be called as a central processing unit (CPU). The processor 210 may be an integrated circuit chip with signal processing capability. The processor 210 may further be a general-purpose processor, a digital signal processor (DSP), an application specific integrated circuit (ASIC), a field programmable gate array (FPGA), or other programmable logic components, a discrete gate or a transistor logic component, or a discrete hardware assembly. The general-purpose processor may be a microprocessor, or the processor 210 may also be any conventional processor, etc.

The memory 220 is configured to store a computer program. The memory 220 may be a random access memory (RAM), a read-only memory (ROM), or other types of storage devices. In some embodiments, the memory 220 may include one or more computer-readable storage mediums, which may be non-transient. The memory may further include high-speed RAM memory and a non-volatile memory, such as one or more magnetic disk storage device and a flash memory storage device. In some embodiments, the non-transient computer-readable storage medium in the memory is configured to store at least one program code.

The processor 210 is configure to execute a computer program stored in the memory 220 to perform a processing method provided in some embodiments of the present disclosure.

In some embodiments, the smart wearable device 100 may further may a peripheral device interface 230 and at least one peripheral device. The processor 210, the memory 220, and the peripheral device interface 230 may be connected to each other via a bus or a signal line. Each peripheral device may be connected to the peripheral device interface 230 through the bus, the signal line, or the circuit board. In some embodiments, the peripheral device includes at least one of a radio frequency (RF) circuit 240, a display screen 250, an audio circuit 260, and a power source interface 270.

The peripheral device interface 230 may be configured to connect at least one peripheral device related to input/output (I/O) to the processor 210 and the memory 220. In some embodiments, the processor 210, the memory 220, and the peripheral device interface 230 are integrated on a same chip or a same circuit board. In other embodiments, any one or any two of the processor 210, the memory 220, and the peripheral device interface 230 may be implemented on a separate chip or a separate circuit board, which is not limited herein.

The RF circuit 240 is configure to receive and transmit a RF signal, which may also be named as an electromagnetic signal. The RF circuit 240 may communicate with communicate with communication networks and other communication devices via the electromagnetic signal, and the RF circuit 240 is a communication circuit of the smart wearable device 100. The RF circuit 240 is configure to convert an electrical signal into the electromagnetic signal for transmission, or convert a received electromagnetic signal into the electrical signal. In some embodiments, the RF circuit 240 may include an antenna system, a RF transceiver, one or more amplifiers, a tuner, an oscillator, a digital signal processor, a codec chip set, a user module card, etc. The RF circuit 240 may communicate with other terminals through at least one wireless communication protocol. The wireless communication protocol may include, but not limit to, world wide web, metropolitan area network (MAN), Intranet, all generation mobile communication internetwork (2G, 3G, 4G and 5G), wireless local area network (LAN) and/or wireless fidelity (Wi-Fi) internetwork. In some embodiments, the RF circuit 240 may further include a circuit related to near field communication (NFC), which is not limited herein.

The display screen 250 is configured to display a User Interface (UI). The UI may include graphics, text, icons, video, and any combination thereof. When the display screen 250 is a touch screen, the display screen 250 may further be capable of collecting a touch signal on the surface of the display screen 250 or above the surface of the display screen 250. The touch signal may be configured as a control signal and may be input to the processor 210 for processing. At this time, the display screen 250 may further be configured to provide a virtual button and/or a virtual keyboard, which may also be named as a soft button and/or a soft keyboard. In some embodiments, the number of the display screens 250 may be one, and the one display screen 250 may be arranged on a front panel of the smart wearable device 100. In other embodiments, the number of the display screens 250 may be at least two. The at least two display screens 250 may be arranged on different surfaces of the smart wearable device 100, respectively. Alternatively, the at least two display screens 250 may be arranged in a foldable manner, that is, the smart wearable device 100 may be a foldable electronic device. In other embodiments, the display screen 250 may be a flexible display screen, and may be arranged on a curved surface or a folded surface of the smart wearable device 100. In some embodiments, the display screen 250 may be in a shape of non-rectangular and irregular, that is, the display screen 250 may be a special-shaped screen. The display screen 250 may be made of a liquid crystal display (LCD), an organic light emitting diode (OLED), and other materials.

The audio circuit 260 may include a microphone and a speaker. The microphone is configured to collect an acoustic wave of the user and an acoustic wave of the environment. In addition, the microphone is further configured to convert the acoustic wave into the electrical signal and input the electrical signal to the processor 210 for processing, or input the electrical signal to the RF circuit 240 for voice communication. For a purpose of stereo acquisition or noise reduction, the number of microphones may be multiple, the multiple microphones may be arranged on different parts of the smart wearable device 100, respectively. The microphone may also be an array microphone or an omnidirectional acquisition microphone. The loudspeaker is configured to convert the electrical signal from the processor 210 or the RF circuit 240 into the acoustic wave. The loudspeaker may be a traditional film loudspeaker or a piezoelectric ceramic loudspeaker. When the speaker is the piezoelectric ceramic speaker, the speaker not only may be configured to convert the electrical signal into an audible acoustic wave, but also may be configured to convert the electrical signal into an inaudible acoustic wave for ranging and other purposes. In some embodiments, the audio circuit 260 may further include a headphone jack.

The power source interface 270 may be configured to connected to an alternating current or a direct current, so as to supply power to each assembly of the smart wearable device 100. Meanwhile, the power interface 270 may also charge the above-mentioned battery 50.

According to the various embodiments of the present disclosure, it should be understood that the disclosed smart wearable device 100 may also be implemented by other means. The embodiments of the smart wearable device 100 described above are merely exemplary. For example, the division of modules or units is only a logical function division. In actual implementation, there may be another division manner. For example, multiple units or components may be combined or integrated into another system, or some features may be ignored or not executed. In addition, the mutual coupling or direct coupling or communication connection shown or discussed may be an indirect coupling or communication connection through some interfaces, devices or units, and may be electrical or in other forms.

The units described as separate parts may be or may not be physically separate, and parts displayed as units may be or may not be physical units, that is, may be located in one position, or may be distributed on multiple network elements. A part or all of the units may be selected according to the actual needs to achieve the objectives of the solutions of the embodiments. In addition, each functional unit in some embodiments of the present disclosure may be integrated into one processing unit, or each unit may exist physically separately. In some embodiments, two or more units may also be integrated into one unit. The above-mentioned integrated unit may be implemented in the form of hardware or in the form of a software functional module. The smart wearable device provided some embodiments of the present disclosure includes the first housing, the second housing, the electrical track assembly, and the circuit board assembly. The second housing is sleeved on the outer side of the first housing. The second annular housing and the first annular housing are configured to be movable relative to each other, and the electrical track assembly and the circuit board assembly are driven to trigger the electrical signal, such that the smart wearable device is easy to operate and has high interaction efficiency.

In some embodiments, the smart wearable device provided in some embodiments of the present disclosure includes the first housing, the second housing, the electrical track assembly, and the circuit board assembly. The second housing is sleeved on the outer side of the first housing. The second housing is rotatable relative to the first housing, to drive the electrical track assembly and the circuit board assembly to cooperate with each other and trigger the first electrical signal. The second housing is movable radially relative to the first housing, to drive the electrical trace assembly and the circuit board assembly to cooperate with each other and trigger the second electrical signal. In some embodiments of the present disclosure, the rotation operation of the second housing relative to the first housing and the pressing operation of the second housing relative to the first housing may be achieved. The rotation operation and the pressing operation may be performed separately, or may be performed simultaneously, so as to trigger different electrical signals, thereby completing different operation instructions for the smart wearable device. In this way, the smart wearable device is easy to operate and has high interaction efficiency, and thus it may be possible to solve the problems of inconvenient operation and low interaction efficiency of a smart wearable device in the related art.

In order to solve the above problem, some embodiments of the present disclosure further provide a working method of the smart wearable device 100.

Figure 19:
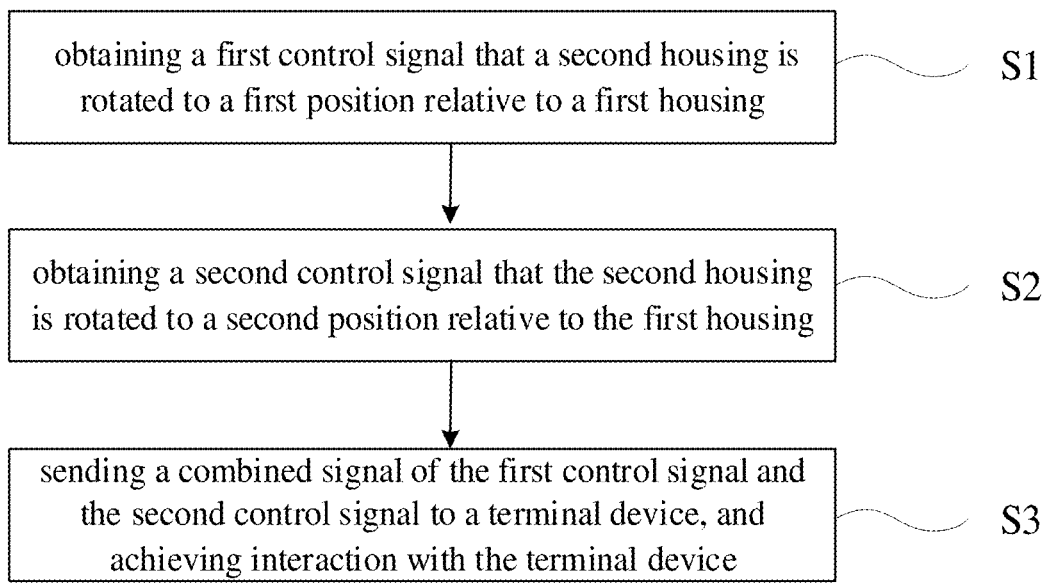
FIG. 19 is a flow chart of a working method of the smart wearable device according to some embodiments of the present disclosure.

As shown in FIG. 19, FIG. 19 is a flow chart of a working method of the smart wearable device according to some embodiments of the present disclosure.

The working method of the smart wearable device 100 provided in some embodiments of the present disclosure may be applicable to the smart wearable device 100 according to any one of the above embodiments, the smart wearable device 100 may be communicatively connected to the terminal device 300. The terminal device 300 may be arranged with a controller 310. The smart wearable device 100 may be wirelessly connected to the controller 310 via the control circuit arranged in the circuit board 32 of the smart wearable device 100, such that the terminal device 300 may obtain information of the smart wearable device 100 and control the smart wearable device 100 by issuing a control instruction. The terminal device 300 may be a mobile phone, a computer, a tablet, an AR, a VR, a MR, and other head-mounted devices. At the same time, the smart wearable device 100 may be capable of interacting with the terminal device 300 for a use interaction or a function interaction of graphical user interface (GUI), such as sliding browsing, page turning, confirmation, deletion, and other function interaction of GUI.

The working method of the smart wearable device 100 may include the following operations.

At an operation S1, obtaining a first control signal that a second housing 20 is rotated to a first position D1 relative to a first housing 10.

In some embodiments, the first position D1 and a second position D2 are different positions in a peripheral direction. The second housing 20 may be rotated to the first position D1 relative to the first housing 10. That is, the first track segment 411 may be moved to the first position D1 to be in contact with the conductive printing layer 33, such that the first track segment 411 may be in contact with and electrically connected to the conductive printing layer 33 to generate the first control signal, and the first control signal may be obtained through the processor 210 of the smart wearable device 100. A specific function of the first control signal may be set as needed.

In some embodiments, the operation S1 may include: obtaining the first control signal generated by performing a first pressing on the second housing 20 at the first position D1 relative to the first housing 10. In some embodiments, the first position D1 and the second position D2 are different positions in the peripheral direction. Herein, the first position D1 may be described as follow. The first pressing may be performed on the second housing 20, such that the second housing 20 may be switched to the first position D1 relative to the first housing 10, and thus the second housing 20 may be relatively close to the first housing 10 in the radial direction, that is, the second housing 20 and the first housing 10 may approach to each other in the radial direction. In this way, the first track segment 411 may be in contact with and electrically connected to the conductive printing layer 33 to generate the first control signal, and the first control signal may be obtained through the processor 210 of the smart wearable device 100. A specific function of the first control signal may be set as needed.

At an operation S2, obtaining a second control signal that the second housing 20 is rotated to a second position D2 relative to the first housing 10.

In some embodiments, the second housing 20 may be rotated to the second position D2 relative to the first housing 10. That is, the first track segment 411 may be moved to a position where the first track segment 411 may be connected to either the first electrical area 331 or the second electrical area 332, or the first track segment 411 is moved to a position where the first track segment 411 cannot be connected to either the first electrical area 331 or the second electrical area 332. In this way, the first electrical area 331 and the second electrical area 332 cannot be electrically connected to each other and may be in the disconnected state, so as to generate the second control signal, and the second control signal may be obtained through the processor 210 of the smart wearable device 100. A specific function of the second control signal may be set as needed.

In some embodiments, the operation S2 may include: obtaining the second control signal generated by performing a second pressing on the second housing 20 at the second position D2 relative to the first housing 10. In some embodiments, the second pressing may be performed on the second housing 20. Herein, the second position D2 may be described as follow. The second pressing may be performed on the second housing 20, such that the second housing 20 may be switched to the second position D2 relative to the first housing 10, and thus the second housing 20 may be relatively away from the first housing 10 in the radial direction. In this way, the first track segment 411 cannot be in contact with either the first electrical area 331 or the second electrical area 332. In this way, the first electrical area 331 and the second electrical area 332 cannot be electrically connected to each other and may be in the disconnected state, so as to generate the second control signal, and the second control signal may be obtained through the processor 210 of the smart wearable device 100. A specific function of the second control signal may be set as needed.

At an operation S3, sending a combined signal of the first control signal and the second control signal to the terminal device 300, and achieving interaction with the terminal device 300.

In some embodiments, after the first control signal and the second control signal are obtained by the processor 210 of the smart wearable device 100, the first control signal and the second control signal may be sent to the controller 310 of the terminal device 300 in a wireless communication manner, such that the control signal of the terminal device 300 may be obtained. In some embodiments, the first control signal may be different from the second control signal, and specific functions thereof may be set as needed. It should be understood that the first pressing and the second pressing are only configured to distinguish the different control signals generated by pressing the second housing 20, and a specific manner of forming the first pressing may be the same as a specific manner of forming the second pressing. In some embodiments, each of the first pressing and the second pressing may be an operation of pressing a point of the second housing 20 to cause the second housing 20 to be close to or away from the first housing 10 in the radial direction. In some embodiments, by performing the first pressing, the second housing 20 may be relatively close to the first housing 10 in the radial direction, that is, the second housing 20 and the first housing 10 may approach to each other in the radial direction, such that the first track segment 411 may be in contact with and electrically connected to the conductive printing layer 33 to generate the first control signal. By performing the second pressing, the second housing 20 may be relatively away from the first housing 10 in the radial direction, such that the first track segment 411 is neither in contact with nor electrically connected to the conductive printing layer 33 to generate the second control signal.

It should be noted that the first control signal and the second control signal herein may correspond to one of the first electric signal and the second electric signal, such as an electric signal configured to transmit and receive a rotation function signal, which is not limited herein.

In some embodiments, a smart wearable device may further be provided by some embodiments of the present disclosure. The smart wearable device includes a first housing, a second housing, an electrical track assembly, and a circuit board assembly. The second housing is sleeved on the outside of the first housing. The electrical track assembly is arranged between the first housing and the second housing. The circuit board assembly is arranged between the first housing and the second housing. The electrical track assembly is arranged on an outer side of the first housing. The circuit board assembly is arranged on an inner side of the second housing. The second housing and the first housing are configured to be moveable relative to each other, such that the electrical track assembly and the circuit board assembly may be driven to cooperate with each other and trigger an electrical signal.

The smart wearable device provided in some embodiments of the present disclosure includes the first housing, the second housing, the electrical track assembly, and the circuit board assembly. The second housing is sleeved on the outer side of the first housing. The electrical track assembly is arranged between the first housing and the second housing. The circuit board assembly is arranged between the first housing and the second housing. The electrical track assembly is arranged on the outer side of the first housing. The circuit board assembly is arranged on the inner side of the second housing. the conductive printing layer is arranged on the surface of the circuit board assembly close to the electrical track assembly. The second housing and the first housing are configured to be moveable relative to each other, such that the electrical track assembly and the circuit board assembly may be driven to cooperate with each other and trigger the electrical signal. The circuit board assembly provided in some embodiments of the present disclosure is arranged on the inner side of the second housing, and the conductive printing layer is arranged on the surface of the circuit board assembly close to the electrical track assembly, such that the circuit board may be designed with the relatively large length based on the needs, which may be easy to process and mount. At the same time, the second housing and the first housing are configured to be moveable relative to each other, such that the electrical track assembly and the circuit board assembly may be driven to cooperate with each other and trigger the electrical signal. In this way, it may be possible to solve the problems of inconvenient operation and low interaction efficiency of a smart wearable device in the related art, and the smart wearable device provided in some embodiments of the present disclosure is easy to operate and has high interaction efficiency.

In some embodiments, a smart wearable device may further be provided by some embodiments of the present disclosure. The smart wearable device includes a first housing, a second housing, an electrical track assembly, and a circuit board assembly. The second housing is sleeved on an outer side of the first housing. The electrical track assembly is arranged between the first housing and the second housing, and includes a first track segment. The circuit board assembly is arranged between the first housing and the second housing. A conductive printing layer is arranged on a surface of the circuit board assembly close to the electrical track assembly. The conductive printing layer includes a first electrical area and a second electrical area insulated from each other. The first track segment is in contact with the conductive printing layer. The first electrical area includes a first strip-shaped portion and a plurality of first protruding portions. The plurality of first protruding portions are connected to a side of the first strip-shaped portion close to the second electrical area. The plurality of first protruding portions are arranged at intervals along an extending direction of the first strip-shaped portion. The second housing is rotatable relative to the first housing, such that the first track segment may be driven to slide on a surface of the conductive printing layer along a peripheral direction, and the first electrical area and the second electrical area may be alternately switched between a disconnected state and a connected state in which the first electrical area is electrically connected to the second electrical area by the first track segment.

The smart wearable device provided in some embodiments of the present disclosure includes the first housing, the second housing, the electrical track assembly, and the circuit board assembly. The second housing is sleeved on the outer side of the first housing. The electrical track assembly is arranged between the first housing and the second housing, and includes the first track segment. The circuit board assembly is arranged between the first housing and the second housing. the conductive printing layer is arranged on the surface of the circuit board assembly close to the electrical track assembly. The conductive printing layer includes the first electrical area and the second electrical area insulated from each other. The first track segment is in contact with the conductive printing layer. The first electrical area includes the first strip-shaped portion and the plurality of first protruding portions. The plurality of first protruding portions are connected to the side of the first strip-shaped portion close to the second electrical area. The plurality of first protruding portions are arranged at intervals along the extending direction of the first strip-shaped portion. The second housing is rotatable relative to the first housing, such that the first track segment may be driven to slide on the surface of the conductive printing layer along the peripheral direction, and the first electrical area and the second electrical area may be alternately switched between the disconnected state and the connected state in which the first electrical area is electrically connected to the second electrical area by the first track segment. The circuit board assembly provided in some embodiments of the present disclosure is arranged on the inner side of the second housing, and the conductive printing layer is arranged on the surface of the circuit board assembly close to the electrical track assembly, such that the circuit board may be designed with the relatively large length based on the needs, which may be easy to process and mount. At the same time, the second housing is rotatable relative to the first housing, such that the first track segment may be driven to slide on the surface of the conductive printing layer along the peripheral direction, and the first electrical area and the second electrical area may be alternately switched between the disconnected state and the connected state in which the first electrical area is electrically connected to the second electrical area by the first track segment. In this way, it may be possible to solve the problems of inconvenient operation and low interaction efficiency of a smart wearable device in the related art, and the smart wearable device provided in some embodiments of the present disclosure is easy to operate and has high interaction efficiency.

In some embodiments, a smart wearable device may further be provided by some embodiments of the present disclosure. The smart wearable device includes a first housing, a second housing, an electrical track assembly, and a circuit board assembly. The second housing is sleeved on an outer side of the first housing. The electrical track assembly is arranged between the first housing and the second housing, and includes a first track segment. The circuit board assembly is arranged between the first housing and the second housing. A conductive printing layer is arranged on a surface of the circuit board assembly close to the electrical track assembly. The conductive printing layer includes a third electrical area and a fourth electrical area insulated from each other. The electrical track assembly includes a first track segment, a second track segment, and a third track segment. The second track segment is electrically connected to the third electric area, and the third track segment is electrically connected to the fourth electric area. The first track segment is enabled to switch between an initial state and a pressed state. When the first track segment is in the initial state, the first track segment is not in contact with at least one of the second track segment and the third track segment, such that the third electrical area and the fourth electrical area are in the disconnected state. When the first track segment is in the pressed state, the first track segment is in contact with the second track segment and the third track segment, respectively, such that the third electrical area is electrically connected to the fourth electrical area. During a process of the second housing moving radially relative to the first housing, the first track segment is enabled to switch to the press state, such that the third electrical area is electrically connected to the fourth electrical area by the first track segment.

The smart wearable device provided in some embodiments of the present disclosure includes the first housing, the second housing, the electrical track assembly, and the circuit board assembly. The second housing is sleeved on the outer side of the first housing. The electrical track assembly is arranged between the first housing and the second housing, and includes the first track segment. The circuit board assembly is arranged between the first housing and the second housing. the conductive printing layer is arranged on the surface of the circuit board assembly close to the electrical track assembly. The conductive printing layer includes the third electrical area and the fourth electrical area insulated from each other. The electrical track assembly includes the first track segment, the second track segment, and the third track segment. The second track segment is electrically connected to the third electric area, and the third track segment is electrically connected to the fourth electric area. The first track segment is enabled to switch between the initial state and the pressed state. When the first track segment is in the initial state, the first track segment is not in contact with the at least one of the second track segment and the third track segment, such that the third electrical area and the fourth electrical area are in the disconnected state. When the first track segment is in the pressed state, the first track segment is in contact with the second track segment and the third track segment, respectively, such that the third electrical area is electrically connected to the fourth electrical area. During the process of the second housing moving radially relative to the first housing, the first track segment is enabled to switch to the press state, such that the third electrical area is electrically connected to the fourth electrical area by the first track segment. The circuit board assembly provided in some embodiments of the present disclosure is arranged on the inner side of the second housing, and the conductive printing layer is arranged on the surface of the circuit board assembly close to the electrical track assembly, such that the circuit board may be designed with the relatively large length based on the needs, which may be easy to process and mount. At the same time, the second housing is rotatable relative to the first housing, such that the first track segment may be driven to slide on the surface of the conductive printing layer along the peripheral direction, and the first electrical area and the second electrical area may be alternately switched between the disconnected state and the connected state in which the first electrical area is electrically connected to the second electrical area by the first track segment. In addition, it may be possible to electrically connect the second track segment to the third electrical area, and electrically connect the third track segment to the fourth electrical area, so as to realize the control of the smart wearable device. In this way, it may be possible to solve the problems of inconvenient operation and low interaction efficiency of a smart wearable device in the related art, and the smart wearable device provided in some embodiments of the present disclosure is easy to operate and has high interaction efficiency.

In some embodiments, an electrical track assembly may further be provided by the present disclosure. The electrical track assembly may be configured to connect a circuit board assembly of the smart wearable device. The electrical track assembly includes a second track segment and a third track segment. The second track segment includes a first fixing segment and a first elastic piece connected to the first fixing segment. The first elastic piece is disposed on a side of the first fixing segment. The third track segment and the second track segment are insulated from each other and arranged at intervals. The third track segment includes a second fixing segment and a second elastic piece connected to the second fixing segment. The second fixing segment is disposed substantially parallel to the first fixing segment. The second elastic piece is disposed on a side of the second fixing segment away from the first fixing segment. The circuit board assembly is arranged with a conductive printing layer. The second track segment and the third track segment are cooperatively configured to be moveable relative to the circuit board assembly, and the first elastic piece and the second elastic piece may be allowed to electrically connect the conductive printing layer, respectively.

The electric track assembly provided in some embodiments of the present disclosure may be configured to connect the circuit board assembly of the smart wearable device. The electrical track assembly includes the second track segment and the third track segment. The second track segment includes the first fixing segment and the first elastic piece connected to the first fixing segment. The first elastic piece is disposed on the side of the first fixing segment. The third track segment and the second track segment are insulated from each other and arranged at intervals. The third track segment includes the second fixing segment and the second elastic piece connected to the second fixing segment. The second fixing segment is disposed substantially parallel to the first fixing segment. The second elastic piece is disposed on the side of the second fixing segment away from the first fixing segment. The circuit board assembly is arranged with the conductive printing layer. The second track segment and the third track segment are cooperatively configured to be moveable relative to the circuit board assembly, and the first elastic piece and the second elastic piece may be allowed to electrically connect the conductive printing layer, respectively. The circuit board assembly provided in some embodiments of the present disclosure is arranged on the surface of the circuit board assembly close to the electrical track assembly, such that the circuit board may be designed with the relatively large length based on the needs, which may be easy to process and mount. At the same time, the second track segment and the third track segment are cooperatively configured to be moveable relative to the circuit board assembly, and the first elastic piece and the second elastic piece may be allowed to electrically connect the conductive printing layer, respectively. In this way, the second track segment and the third track segment may be alternately switched between the disconnected state and the connected state in which the second track segment is electrically connected to the third track segment by the first track segment, so as to realize the control of the smart wearable device. In this way, it may be possible to solve the problems of inconvenient operation and low interaction efficiency of a smart wearable device in the related art, and the smart wearable device provided in some embodiments of the present disclosure is easy to operate and has high interaction efficiency.

In some embodiments, a circuit board assembly may further be provided by some embodiments of the present disclosure. The circuit board assembly may be configured to connect an electrical track assembly of the smart wearable device. The circuit board assembly includes a circuit board, and the circuit board includes a main body segment and a bending segment flexibly connected to each other. A conductive printing layer is arranged on a first surface of the main body segment. An electric assembly is arranged on a surface of the bending segment. The conductive printing layer is electrically connected to the electric assembly. The bending segment is configured to allow bending relative to the main body segment to enable the electrical assembly to be positioned on a side opposite to the conductive printing layer. The electric track assembly is arranged with a trackpad. The main body segment is configured to be moveable relative to a track segment and allow the conductive printing layer to be electrically connected to the trackpad.

The circuit board assembly provided in some embodiments of the present disclosure may be configured to connect the electrical track assembly of the smart wearable device. The circuit board assembly includes the circuit board, and the circuit board includes the main body segment and the bending segment flexibly connected to each other. the conductive printing layer is arranged on the first surface of the main body segment. The electric assembly is arranged on the surface of the bending segment. The conductive printing layer is electrically connected to the electric assembly. The bending segment is configured to allow bending relative to the main body segment to enable the electrical assembly to be positioned on the side opposite to the conductive printing layer. The electric track assembly is arranged with the trackpad. The main body segment is configured to be moveable relative to the track segment and allow the conductive printing layer to be electrically connected to the trackpad. In some embodiments of the present disclosure, the conductive printing layer is arranged on the surface of the circuit board assembly close to the electrical track assembly, such that the circuit board may be designed with the relatively large length based on the needs, which may be easy to process and mount. At the same time, the main body segment and the bending segment may be bent, and the bending segment may be capable of bending relative to the main body segment to enable the electrical assembly to be positioned on the side opposite to the conductive printing layer, such that it may be easy to mount the electrical components without interfering with the conductive printing layer. The main body segment is configured to move relative to the track segment and allow the conductive printing layer to be electrically connected to the trackpad, such that the conductive printing layer and the trackpad may be switched between the electrically connected state and the disconnected state, thereby realizing the control of the smart wearable device. In this way, it may be possible to solve the problems of inconvenient operation and low interaction efficiency of a smart wearable device in the related art, and the smart wearable device provided in some embodiments of the present disclosure is easy to operate and has high interaction efficiency.

In some embodiments, a circuit board assembly may further be provided by some embodiments of the present disclosure. The circuit board assembly may be configured to connect an electrical track assembly of the smart wearable device. The circuit board assembly includes a conductive printing layer, and the conductive printing layer includes a first electrical area and a second electrical area insulated from each other. The first electrical area and the second electrical area are configured to connect the electrical track assembly of the smart wearable device. The first electrical area includes a first strip-shaped portion and a plurality of first protruding portions. The plurality of first protruding portions are connected to a side of the first strip-shaped portion close to the second electrical area. The second electrical area includes a second strip-shaped portion and a plurality of second protruding portions. The plurality of second protruding portions are connected to a side of the second strip-shaped portion close to the first electrical area. The plurality of first protruding portions and the plurality of second protruding portions are alternately arranged periodically and spaced apart from each other along a first direction.

The circuit board assembly provided in some embodiments of the present disclosure includes a conductive printing layer, and the conductive printing layer includes the first electrical area and the second electrical area insulated from each other. The first electrical area and the second electrical area are configured to connect the electrical track assembly of the smart wearable device. The first electrical area includes the first strip-shaped portion and the plurality of first protruding portions. The plurality of first protruding portions are connected to the side of the first strip-shaped portion close to the second electrical area. The second electrical area includes the second strip-shaped portion and the plurality of second protruding portions. The plurality of second protruding portions are connected to the side of the second strip-shaped portion close to the first electrical area. The plurality of first protruding portions and the plurality of second protruding portions are alternately arranged periodically and spaced apart from each other along the first direction. In some embodiments of the present disclosure, the plurality of first protruding portions and the plurality of second protruding portions are alternately arranged periodically and spaced apart from each other along the first direction, such that the first electrical area and the second electrical area may be alternately switched between a disconnected state and a connected state in which the first electrical area is electrically connected to the second electrical area by the electrical track assembly, thereby realizing the control of the smart wearable device. In this way, it may be possible to solve the problems of inconvenient operation and low interaction efficiency of a smart wearable device in the related art, and the smart wearable device provided in some embodiments of the present disclosure is easy to operate and has high interaction efficiency.

The above description shows only embodiments of the present disclosure and does not limit the scope of the present disclosure. Any equivalent structure or equivalent process transformation performed based on the specification and accompanying drawings, applied directly or indirectly in other related fields, shall be equally covered by the scope of the present disclosure.

What is claimed is:

1. A smart wearable device, comprising:
   a first housing;
   a second housing, sleeved on an outer side of the first housing;
   an electrical track assembly; and
   a circuit board assembly;
   wherein the second housing and the first housing are configured to be movable relative to each other, and the electrical track assembly and the circuit board assembly are driven to cooperate with each other and trigger an electrical signal;
   wherein the electrical signal comprises a first electrical signal and a second electrical signal, and a function corresponding to the first electrical signal is different from a function corresponding to the second electrical signal;
   the second housing is rotatable relative to the first housing, and the electrical track assembly and the circuit board assembly are driven to cooperate with each other and trigger the first electrical signal; and
   the second housing is movable radially relative to the first housing, and the electrical track assembly and the circuit board assembly are driven to cooperate with each other and trigger the second electrical signal.

2. The smart wearable device according to claim 1, wherein the circuit board assembly comprises a conductive printing layer comprising a first electrical area and a second electrical area insulated from each other, wherein each of the first electric area and the second electric area extends along a periphery of the second housing and is arc-shaped;
   the electrical track assembly comprises a first track segment in contact with the conductive printing layer; and
   during a process of the second housing rotating relative to the first housing, the first track segment is enabled to rotate relative to the conductive printing layer, such that the first electrical area and the second electrical area are alternately switched between a disconnected state and a connected state in which the first electrical area is electrically connected to the second electrical area by the first track segment.

3. The smart wearable device according to claim 2, wherein the electrical track assembly further comprises a bracket fixedly sleeved on the outer side of the first housing, the electrical track assembly is arranged on an outer surface of the bracket or an inner surface of the bracket, and the circuit board assembly is arranged on an inner side of the electrical track assembly or an outer side of the electrical track assembly; and
   one end of the first track segment is fixedly connected to the bracket, the other end of the first track segment is bent to form a first recess and a first protrusion facing the conductive printing layer, and the first protrusion elastically abuts against the conductive printing layer.

4. The smart wearable device according to claim 3, wherein an elastic member is arranged between the first track segment and the bracket, and the elastic member is configured to drive the first protrusion to elastically abut against the conductive printing layer; and
   the bracket is an annular bracket, an opening is defined on the bracket, a part of the elastic member is embedded in the opening, and another part of the elastic member protrudes out of the opening and is engaged in the first recess.

5. The smart wearable device according to claim 2, wherein the first electrical area comprises a first strip-shaped portion and a plurality of first protruding portions, and the plurality of first protruding portions are connected to a side of the first strip-shaped portion close to the second electrical area;
   the second electrical area comprises a second strip-shaped portion and a plurality of second protruding portions, and the plurality of second protruding portions are connected to a side of the second strip-shaped portion close to the first electrical area; and
   the plurality of first protruding portions and the plurality of second protruding portions are alternately arranged, or are oppositely arranged in pairs along a peripheral direction.

6. The smart wearable device according to claim 2, wherein a third barrier area is arranged between the first electrical area and the second electrical area, the third barrier area is periodically arranged along a first direction and electrically insulates the first electrical area from the second electrical area.

7. The smart wearable device according to claim 2, wherein the conductive printing layer comprises a third electrical area and a fourth electrical area insulated from each other, and each of the third electric area and the fourth electric area extends along the periphery of the second housing and is arc-shaped;
   the electrical track assembly further comprises: a second track segment, electrically connected to the third electrical area, and a third track segment, electrically connected to the fourth electrical area;
   the first track segment is enabled to switch between an initial state and a pressed state;
   in response to the first track segment being in the initial state, the first track segment is not in contact with at least one of the second track segment and the third track segment, such that the third electrical area and the fourth electrical area are in the disconnected state;
   in response to the first track segment being in the pressed state, the first track segment is in contact with the second track segment and the third track segment, respectively, such that the third electrical area is electrically connected to the fourth electrical area; and
   during a process of the second housing moving radially relative to the first housing, the first track segment is enabled to switch to the pressed state, and the third electrical area is electrically connected to the fourth electrical area by the first track segment.

8. The smart wearable device according to claim 7, wherein the third electrical area is disposed on a side of the first electrical area away from the second electrical area along an axial direction, and the third electrical area is insulated from the first electrical area;
- the fourth electrical area is disposed on a side of the second electrical area away from the first electrical area along the axial direction, and the fourth electrical area is insulated from the second electrical area;
- the electrical track assembly further comprises a bracket;
- the second track segment comprises a first fixing segment and a plurality of first elastic pieces, the first fixing segment is fixedly sleeved on an inner surface of the bracket or an outer surface of the bracket, and the plurality of first elastic pieces are connected to the first fixing segment and elastically abut against the third electrical area;
- the third track segment comprises a second fixing segment and a plurality of second elastic pieces, the second fixing segment is fixedly sleeved on the inner surface of the bracket or the outer surface of the bracket, and the plurality of second elastic pieces are connected to the second fixing segment and elastically abut against the fourth electrical area;
- the second track segment and the third track segment are disposed on a same surface of the bracket; and
- a first gap is defined between the first fixing segment and the second fixing segment, one end of the first track segment passes through the first gap and is fixedly connected to the bracket, and the other end of the first track segment is suspended on a side of the bracket away from the first fixing segment and the second fixing segment to define a second gap.

9. The smart wearable device according to claim 8, wherein one end of each of the plurality of first elastic pieces is connected to a side of the first fixing segment away from the second fixing segment, the other end of the each of the plurality of first elastic pieces is bent to form a second recess and a second protrusion facing the conductive printing layer, and the second protrusion elastically abuts against the third electrical area; and one end of each of the plurality of second elastic pieces is connected to a side of the second fixing segment away from the first fixing segment, the other end of the each of the plurality of second elastic pieces is bent to form a third recess and a third protrusion facing the conductive printing layer, and the third protrusion elastically abuts against the fourth electrical area; and/or
- wherein the first gap comprises a plurality of first sub-gaps and a plurality of second sub-gaps, the plurality of first sub-gaps and the plurality of second sub-gaps are alternately arranged along the peripheral direction, and a width of each of the plurality of first sub-gaps is greater than a width of the each of the plurality of second sub-gaps; and the bracket is an annular bracket, an opening is defined on a position of the bracket corresponding to a corresponding one of the plurality of first sub-gaps, the elastic member is partially embedded in the opening, one end of the first track segment passes through the first sub-gap and is fixedly connected to the bracket, and the other end of the first track segment is suspended on a side of the bracket away from a corresponding one of the plurality of second sub-gaps.

10. The smart wearable device according to claim 7, wherein, when the first track segment is pressed, the first track segment is in contact with both the second track segment and the third track segment, the third electrical area is indirectly electrically connected to the fourth electrical area via the first track segment, and the first electrical signal and the second electrical signal are triggered.

11. The smart wearable device according to claim 1, wherein the circuit board assembly comprises a circuit board, the circuit board comprises a main body segment and a bending segment flexibly connected to each other, a conductive printing layer is arranged on a surface of the main body segment facing the electrical track assembly, an electrical assembly is arranged on a surface of the bending segment, the conductive printing layer is electrically connected to the electrical assembly, the bending segment is configured to allow to bend relative to the main body segment and enable the electrical assembly to be positioned on a side opposite to the conductive printing layer; and/or
- the circuit board assembly further comprises a third housing sleeved between the first housing and the second housing, a first notch is defined on the third housing, the main body segment is annularly arranged on an inner side of the third housing, and the bending segment extends from the first notch and is arranged on an outer side of the third housing after being bent, and an electrical assembly is arranged on a surface of the bending segment away from the third housing.

12. The smart wearable device according to claim 11, wherein the circuit board comprises a first bending segment flexibly connected to one end of the main body segment and a second bending segment flexibly connected to the other end of the main body segment;
- the first bending segment extends from one side of the first notch and is arranged on an outer side of the third housing after being bent, and a first electrical component is arranged on a surface of the first bending segment away from the third housing;
- the second bending segment extends from the other side of the first notch and is arranged on the outer side of the third housing after being bent, and a second electrical component is arranged on a surface of the second bending segment away from the third housing; and
- each of the first electrical component and the second electrical component comprises at least one of a main control chip, a driving circuit, a communication circuit, a capacitor, a resistor, and an inductor.

13. The smart wearable device according to claim 12, wherein the smart wearable device further comprises a battery, defining a second notch, annularly arranged around a periphery of the third housing, and electrically connected to the circuit board, wherein an opening size of the first notch is less than an opening size of the second notch, and the bending segment and the electrical assembly are disposed in the second notch; and/or
- a second annular flange is arranged on one end of an inner side of the second housing, and a third annular flange is arranged on the other end of an outer side of the third housing, the second annular flange and the third annular flange are disposed on opposite ends of the battery along an axial direction and are configured to limit the battery and the bending segment.

14. The smart wearable device according to claim 13, wherein the smart wearable device further comprises an annular cover plate sleeved on an end of the outer side of the first housing;
- a first annular flange is arranged on the other end of the outer side of the first housing, and the first annular flange and the annular cover plate are configured to limit the second housing along the axial direction; and
- the second housing is matched with the third housing to form a rotating housing, an axial length of the rotating housing is less than a distance between the first annular flange and the annular cover plate.

15. The smart wearable device according to claim 14, wherein,
a first clamping portion is arranged on an end of the rotating housing, and a second clamping portion is arranged on at least one of the first annular flange and the annular cover plate and is matched with the first clamping portion;
one of the first clamping portion and the second clamping portion is a protruding portion, and the other of the first clamping portion and the second clamping portion is a groove;
the number of at least one of the first clamping portion and the second clamping portion is multiple, and a plurality of first clamping portions or a plurality of second clamping portion are arranged at intervals along the peripheral direction; and
during a process of the second housing rotating relative to the first housing, a matching between the second clamping portion and the first clamping portion is periodically switched.

16. The smart wearable device according to claim 11, wherein a central angle between two ends of the bending segment is in a range from 200 to 60°, a central angle between two ends of a periphery of an orthographic projection area of the main body segment is greater than 180°.

17. The smart wearable device according to claim 1, wherein a plurality of touch electrodes are arranged on an outer side of the second housing, are arranged at intervals along a periphery of the second housing, and are electrically connected to the circuit board assembly, respectively; and
the circuit board assembly is configured to determine a rotation direction of the second housing through an order in which the plurality of touch electrodes are touched.

18. A smart wearable device, comprising:
a first housing;
a second housing, sleeved on an outer side of the first housing;
an electrical track assembly, arranged between the first housing and the second housing; and
a circuit board assembly, arranged between the first housing and the second housing;
wherein the electrical track assembly is arranged on the outer side of the first housing, and the circuit board assembly is arranged on an inner side of the second housing, the second housing and the first housing are configured to be movable relative to each other, and the electrical track assembly and the circuit board assembly are driven to cooperate with each other and trigger an electrical signal;
wherein the electrical signal comprises a first electrical signal and a second electrical signal, and a function corresponding to the first electrical signal is different from a function corresponding to the second electrical signal;
the second housing is rotatable relative to the first housing, and the electrical track assembly and the circuit board assembly are driven to cooperate with each other and trigger the first electrical signal; and
the second housing is movable radially relative to the first housing, and the electrical track assembly and the circuit board assembly are driven to cooperate with each other and trigger the second electrical signal.

19. A smart wearable device, comprising:
a first housing;
a second housing, sleeved on an outer side of the first housing;
an electrical track assembly, arranged between the first housing and the second housing; and
a circuit board assembly, arranged between the first housing and the second housing;
wherein the electrical track assembly comprises a first track segment arranged on the outer side of the first housing, and a conductive printing layer is arranged on a surface of the circuit board assembly close to the electrical track assembly; and
the second housing is rotatable relative to the first housing, and the electrical track assembly is driven to be in contact with and electrically connected to the circuit board assembly, to trigger an electrical signal;
wherein the conductive printing layer comprises a first electrical area and a second electrical area insulated from the first electrical area, wherein each of the first electric area and the second electric area extends along a periphery of the second housing and is arc-shaped;
during a process of the second housing rotating relative to the first housing, the first track segment is rotated relative to the conductive printing layer, and the first electrical area and the second electrical area are alternately switched between a disconnected state and a connected state in which the first electrical area is electrically connected to the second electrical area via the first track segment.

20. The smart wearable device according to claim 19, wherein the electrical track assembly further comprises a bracket, the first track segment is arranged along a periphery of the bracket, and the first track segment elastically abuts against the conductive printing layer; and
one end of the first track segment is fixedly connected to the bracket, the other end of the first track segment is bent to form a first recess and a first protrusion facing the conductive printing layer, and the first protrusion elastically abuts against the conductive printing layer.

* * * * *